(12) United States Patent
Matsuura

(10) Patent No.: US 7,185,957 B2
(45) Date of Patent: Mar. 6, 2007

(54) BRAKING FORCE DISTRIBUTION CONTROL APPARATUS AND METHOD

(75) Inventor: Masahiro Matsuura, Kariya (JP)

(73) Assignee: Advics Co., Ltd., Kariya (JP)

( * ) Notice: Subject to any disclaimer, the term of this patent is extended or adjusted under 35 U.S.C. 154(b) by 24 days.

(21) Appl. No.: 11/054,407

(22) Filed: Feb. 10, 2005

(65) Prior Publication Data

US 2005/0182550 A1 Aug. 18, 2005

(30) Foreign Application Priority Data

Feb. 12, 2004 (JP) ............................. 2004-034606

(51) Int. Cl.
*B60T 8/62* (2006.01)
(52) U.S. Cl. .................................... 303/186
(58) Field of Classification Search ................ 303/155, 303/166, 167, 168, 186–188, 191; 701/41, 701/70, 72
See application file for complete search history.

(56) References Cited

U.S. PATENT DOCUMENTS

| | | | | |
|---|---|---|---|---|
| 5,220,506 A | * | 6/1993 | Kuwana et al. ............... 701/79 |
| 5,387,031 A | * | 2/1995 | Watanabe .................... 303/171 |
| 5,700,074 A | * | 12/1997 | Sugimoto et al. ........... 303/186 |
| 5,869,943 A | * | 2/1999 | Nakashima et al. ........ 318/586 |
| 6,301,534 B1 | * | 10/2001 | McDermott et al. .......... 701/41 |
| 6,456,920 B1 | * | 9/2002 | Nishio et al. ................. 701/70 |
| 2003/0144777 A1 | * | 7/2003 | Schmitt ....................... 701/29 |

FOREIGN PATENT DOCUMENTS

JP 5-278585 10/1993

* cited by examiner

*Primary Examiner*—Chris Schwartz
(74) *Attorney, Agent, or Firm*—Buchanan Ingersoll & Rooney PC

(57) ABSTRACT

A braking force distribution apparatus for a vehicle includes pressure sensors for detecting the internal pressures of the tires, and wheel speed sensors for detecting the angular speeds of the wheels. The apparatus obtains a dynamic load radius change rate of each tire which corresponds to the deviation of the internal pressure of the tire from a reference pressure, obtains a wheel speed for calculation of a slip value on the basis of the angular speed of the tire and the change rate, and obtains a slip value on the basis of the obtained wheel speed. As a result, EBD control is started at proper timing in accordance with the slip value.

7 Claims, 11 Drawing Sheets

<CORRELATION MAP (Map 1) OF INTERNAL PRESSURE DEVIATION vs. DYNAMIC LOAD RADIUS CHANGE RATE>

<CORRELATION MAP (Map 2) OF INTERNAL PRESSURE vs. DYNAMIC LOAD RADIUS>

BRAKING FORCE DISTRIBUTION CONTROL APPARATUS AND METHOD

BACKGROUND OF THE INVENTION

1. Field of the Invention

The present invention relates to a braking force distribution apparatus (front-rear braking force distribution apparatus) and a braking force distribution method which control the ratio of braking force applied to rear wheels to that applied to front wheels when the vehicle is braked.

2. Description of the Related Art

In an ordinary vehicle, when a driver steps on the brake pedal, braking forces are applied to front and rear wheels. In such a case, the ratio of the braking force applied to the rear wheels (hereinafter referred to as "rear wheel braking force") to the braking force applied to the front wheels (hereinafter referred to as "front wheel braking force") is previously set for each vehicle model. When braking is performed in this manner, the load of the vehicle moves toward the front of the vehicle, and thus, the rear wheels become more likely to lock than the front wheels. That is, rear-wheel preceding lock occurs.

A conventionally known braking force distribution apparatus is an apparatus for preventing such rear-wheel preceding lock. More specifically, on the basis of the understanding that the angular speed of front wheels detected by means of a wheel speed sensor for the front wheels is in proportion to the rotational speed of the front wheels (the peripheral speed of tires of the front wheels; hereinafter referred to as "front-wheel wheel speed"), the conventional braking force distribution apparatus obtains the front-wheel wheel speed from the detected front-wheel angular speed. Similarly, on the basis of the understanding that the angular speed of rear wheels detected by means of a wheel speed sensor for the rear wheels is in proportion to the rotational speed of the rear wheels (the peripheral speed of tires of the rear wheels; hereinafter referred to as "rear-wheel wheel speed"), the conventional braking force distribution apparatus obtains the rear-wheel wheel speed from the detected rear-wheel angular speed.

Then, when the apparatus determines that the rear-wheel wheel speed is lower than the front-wheel wheel speed by a predetermined amount, the apparatus increases more gradually, holds, or gradually reduces the brake hydraulic pressure supplied to a rear-wheel braking apparatus (wheel cylinders for the rear wheels), as compared with the case of ordinary braking. As a result, the ratio of the rear wheel braking force to the front wheel braking force decreases, and the decreasing rate of the rear-wheel wheel speed gradually decreases and becomes smaller than that of the front-wheel wheel speed, whereby the rear-wheel wheel speed approaches the front-wheel wheel speed. Subsequently, when the apparatus determines that the difference between the rear-wheel wheel speed and the front-wheel angular speed has become sufficiently small, the apparatus increases the break hydraulic pressure applied to the rear-wheel braking apparatus. As a result, the ratio of the rear wheel braking force to the front wheel braking force returns to the predetermined value.

In other words, the conventional braking force distribution apparatus is designed to operate during braking of the vehicle so as to control the rear wheel braking force in such a manner that the ratio of the rear wheel braking force to the front wheel braking force decreases in accordance with the degree of slippage of the rear wheels as compared with the front wheels. Notably, such braking force distribution control is also called EBD (Electronic Brake force Distribution) control (see, for example, Japanese Patent Application Laid-Open (kokai) No. H5-278585 (paragraph No. 0005, FIG. 1).

Incidentally, even when a wheel rotates at a constant angular speed, the wheel speed changes depending on the dynamic load radius of the tire. Further, the dynamic load radius changes greatly depending on the internal pressure (air pressure) of the tire.

However, the above-described conventional braking force distribution apparatus obtains the front-wheel wheel speed and the rear-wheel wheel speed without consideration of the internal pressures of the respective tires, and on the basis of their relation determines whether to perform braking force distribution control. Therefore, when the internal pressures of the respective tires change, a large error is produced between the obtained front-wheel and rear-wheel wheel speeds and the actual front-wheel and rear-wheel wheel speeds, whereby the braking force distribution control may be started earlier than the timing at which the braking force distribution control ought to be performed, or may fail to be started when such timing has come.

SUMMARY OF THE INVENTION

An object of the present invention is to provide a braking force distribution apparatus and a braking force distribution method which calculate the wheel speed of front wheels and the wheel speed of rear wheels more accurately, and use the calculated wheel speeds for determination of the timing for execution of braking force distribution control, to thereby execute the braking force distribution control at proper timing.

In order to achieve the above object, the present invention provides a braking force distribution apparatus comprising:

front-wheel braking force application means for applying to a front wheel of a vehicle a braking force corresponding to a braking operation;

rear-wheel braking force application means for applying to a rear wheel of the vehicle a braking force corresponding to the braking operation and a control signal;

front-wheel wheel speed obtaining means for obtaining peripheral speed of a tire of the front wheel as front-wheel wheel speed;

rear-wheel wheel speed obtaining means for obtaining peripheral speed of a tire of the rear wheel as rear-wheel wheel speed;

slip value calculation means, operable when the braking operation is performed, for calculating a slip value on the basis of the obtained front-wheel wheel speed and rear-wheel wheel speed, the slip value corresponding to the degree of slippage of the rear wheel with respect to the front wheel; and control signal generation means for generating the control signal in such a manner that the ratio of the braking force applied to the rear wheel to the braking force applied to the front wheel decreases in accordance with the calculated slip value, wherein, the front-wheel wheel speed obtaining means includes:

front-wheel angular speed detection means for detecting angular speed of the front wheel;

front-wheel tire pressure detection means for detecting internal pressure of the tire of the front wheel; and front-wheel wheel speed calculation means for calculating the wheel speed of the front wheel on the basis of the detected angular speed of the front wheel and the detected internal pressure of the tire of the front wheel, and the rear-wheel wheel speed obtaining means includes:

rear-wheel angular speed detection means for detecting angular speed of the rear wheel;

rear-wheel tire pressure detection means for detecting internal pressure of the tire of the rear wheel; and rear-wheel wheel speed calculation means for calculating the wheel speed of the rear wheel on the basis of the detected angular speed of the rear wheel and the detected internal pressure of the tire of the rear wheel.

By virtue of this configuration, the wheel speed of the front wheel and the wheel speed of the rear wheel are calculated on the basis of not only the angular speeds of the respective wheels, but also the tire internal pressures of the respective wheels; i.e., in accordance with the dynamic load radiuses of the respective wheels. Thus, the wheel speed of the front wheel and the wheel speed of the rear wheel can be calculated more accurately. Accordingly, the "slip value indicating the degree of slippage of the rear wheel with respect to the front wheel", which is calculated from these wheel speeds, becomes more accurate. As a result, the braking force distribution control is performed at more proper timing, and locking of the rear wheel prior to that of the front wheel can be avoided more reliably.

Preferably, the braking force distribution apparatus further comprises:

reference pressure setting means for setting, in response to an external operation signal, values corresponding to the tire internal pressure of the front wheel and the tire internal pressure of the rear wheel, respectively, as a reference tire pressure of the front wheel and a reference tire pressure of the rear wheel, wherein the front-wheel wheel speed calculation means calculates a value indicative of a change in dynamic load radius of the tire of the front wheel on the basis of a deviation of the detected tire internal pressure of the front wheel from the reference tire pressure of the front wheel, and calculates the wheel speed of the front wheel on the basis of the detected angular speed of the front wheel and the calculated value indicative of the change in dynamic load radius of the tire of the front wheel;

the rear-wheel wheel speed calculation means calculates a value indicative of a change in dynamic load radius of the tire of the rear wheel on the basis of a deviation of the detected tire internal pressure of the rear wheel from the reference tire pressure of the rear wheel, and calculates the wheel speed of the rear wheel on the basis of the detected angular speed of the rear wheel and the calculated value indicative of the change in dynamic load radius of the tire of the rear wheel; and the slip value calculation means calculates the slip value on the basis of the calculated wheel speed of the front wheel and the calculated wheel speed of the rear wheel.

The dynamic load radius of a tire changes depending on, for example, the type of the tire and cannot be univocally determined from only the internal pressure of the tire. Meanwhile, the relation between the deviation of the internal pressure of the tire from the reference pressure and a change in the dynamic load radius based on the deviation can be considered to be generally constant irrespective of the type of the tire. In view of this, for each wheel, a value indicative of a change in dynamic load radius is calculated on the basis of the deviation of the tire internal pressure of the wheel from the reference tire pressure set for the wheel, and the wheel speed of the wheel is obtained on the basis of the calculated value indicative of the change in dynamic load radius and the angular speed of the wheel. In this case, the obtained wheel speed is close to the accurate peripheral speed of the tire. As a result, the slip value is calculated more accurately, so that the braking force distribution control is performed at more proper timing. Thus, locking of the rear wheel prior to that of the front wheel can be avoided more reliably.

Preferably, the front-wheel wheel speed calculation means includes front-wheel tire pressure condition determination means for determining whether the detected tire internal pressure of the front wheel satisfies a prescribed pressure condition for the front wheel. When the detected tire internal pressure of the front wheel does not satisfy the pressure condition for the front wheel, the front-wheel wheel speed calculation means calculates the wheel speed of the front wheel on the basis of the detected angular speed of the front wheel and the detected tire internal pressure of the front wheel. When the detected tire internal pressure of the front wheel satisfies the pressure condition for the front wheel, the front-wheel wheel speed calculation means calculates the wheel speed of the front wheel on the basis of the detected angular speed of the front wheel without consideration of the detected tire internal pressure of the front wheel. The rear-wheel wheel speed calculation means includes rear-wheel tire pressure condition determination means for determining whether the detected tire internal pressure of the rear wheel satisfies a prescribed pressure condition for the rear wheel. When the detected tire internal pressure of the rear wheel does not satisfy the pressure condition for the rear wheel, the rear-wheel wheel speed calculation means calculates the wheel speed of the rear wheel on the basis of the detected angular speed of the rear wheel and the detected tire internal pressure of the rear wheel. When the detected tire internal pressure of the rear wheel satisfies the pressure condition for the rear wheel, the rear-wheel wheel speed calculation means calculates the wheel speed of the rear wheel on the basis of the detected angular speed of the rear wheel without consideration of the detected tire internal pressure of the rear wheel.

The wheel speed is desired to be calculated in consideration of the tire internal pressure of the wheel; for example, in the case where the dynamic load radius of the tire changes greatly because of a change in the tire internal pressure. In the above-described configuration, whether the wheel speed is to be calculated in consideration of the tire internal pressure of the wheel is determined on the basis of the result of the determination as to whether the tire internal pressure satisfies the prescribed pressure condition (pressure condition for the front wheel or pressure condition for the rear wheel). When the determination result indicates that the tire internal pressure satisfies the prescribed pressure condition, the wheel speed is calculated from the detected angular speed without consideration of the tire internal pressure. When the determination result indicates that the tire internal pressure does not satisfy the prescribed pressure condition, in consideration of the influence of the tire internal pressure on the wheel speed, the wheel speed is calculated on the basis of the detected angular speed and tire internal pressure. Accordingly, each of the wheel speed of the front wheel and the wheel speed of the rear wheel becomes a value which corresponds to the great change in the dynamic load radius of the tire and is a closer approximation of the tire peripheral speed. As a result, the slip value is calculated more accurately, so that the braking force distribution control is performed at more proper timing.

The present invention also provides a braking force distribution apparatus for a four-wheeled vehicle, comprising:

front-wheel braking force application means for applying to left and right front wheels of the vehicle a braking force corresponding to a braking operation;

rear-wheel braking force application means for applying to left and right rear wheels of the vehicle a braking force corresponding to the braking operation and a control signal;

front-wheel wheel speed obtaining means for obtaining a front-wheel wheel speed substantially representing the wheel speed of the front wheels;

rear-wheel wheel speed obtaining means for obtaining a rear-wheel wheel speed substantially representing the wheel speed of the rear wheels;

slip value calculation means, operable when the braking operation is performed, for calculating a slip value on the basis of the obtained front-wheel wheel speed and rear-wheel wheel speed, the slip value corresponding to the degree of slippage of the rear wheels with respect to the front wheels; and control signal generation means for generating the control signal in such a manner that the ratio of the braking force applied to the rear wheels to the braking force applied to the front wheels decreases in accordance with the calculated slip value, wherein the front-wheel wheel speed obtaining means includes:

front-wheel angular speed detection means for detecting angular speed of the left front wheel and angular speed of the right front wheel;

front-wheel tire pressure detection means for detecting internal pressure of the tire of the left front wheel and internal pressure of the tire of the right front wheel;

front-wheel tire pressure condition determination means for determining whether each of the detected internal pressure of the tire of the left front wheel and the detected internal pressure of the tire of the right front wheel satisfies a predetermined pressure condition for the front wheels; and front-wheel wheel speed calculation means for calculating the wheel speed of the front wheels on the basis of the angular speeds of the left and right front wheels when both the detected internal pressures of the tires of the left and right front wheels satisfy the pressure condition for the front wheels, and for calculating the wheel speed of the front wheels on the basis of the angular speed of one wheel which satisfies the pressure condition for the front wheels without consideration of the angular speed of the other wheel which fails to satisfy the pressure condition for the front wheels when only one of the detected internal pressures of the tires of the left and right front wheels satisfies the pressure condition for the front wheels, and the rear-wheel wheel speed obtaining means includes:

rear-wheel angular speed detection means for detecting angular speed of the left rear wheel and angular speed of the right rear wheel;

rear-wheel tire pressure detection means for detecting internal pressure of the tire of the left rear wheel and internal pressure of the tire of the right rear wheel;

rear-wheel tire pressure condition determination means for determining whether each of the detected internal pressure of the tire of the left rear wheel and the detected internal pressure of the tire of the right rear wheel satisfies a predetermined pressure condition for the rear wheels; and rear-wheel wheel speed calculation means for calculating the wheel speed of the rear wheels on the basis of the angular speeds of the left and right rear wheels when both the detected internal pressures of the tires of the left and right rear wheels satisfy the pressure condition for the rear wheels, and for calculating the wheel speed of the rear wheels on the basis of the angular speed of one wheel which satisfies the pressure condition for the rear wheels without consideration of the angular speed of the other wheel which fails to satisfy the pressure condition for the rear wheels when only one of the detected internal pressures of the tires of the left and right rear wheels satisfies the pressure condition for the rear wheel.

This braking force distribution apparatus removes, from the data used in calculation of the slip value, information (e.g., angular speed) regarding a wheel corresponding to a tire which fails to satisfy the predetermined pressure condition (pressure condition for the front wheels and pressure condition for the rear wheels), and calculates the front-wheel wheel speed and the rear-wheel wheel speed by use of only the angular speeds of the wheels to which the remaining tires are attached. Accordingly, the front-wheel wheel speed substantially representing the wheel speed of the front wheels and the rear-wheel wheel speed substantially representing the wheel speed of the rear wheels can be calculated accurately, and thus a more accurate slip value can be calculated on the basis of the front-wheel wheel speed and the rear-wheel wheel speed calculated in this manner. As a result, the braking force distribution control is performed at more proper timing.

The present invention also provides a braking force distribution apparatus for a four-wheeled vehicle, comprising:

front-wheel braking force application means for applying to left and right front wheels of the vehicle a braking force corresponding to a braking operation;

rear-wheel braking force application means for applying to left and right rear wheels of the vehicle a braking force corresponding to the braking operation and a control signal;

front-wheel wheel speed obtaining means for obtaining a front-wheel wheel speed substantially representing the wheel speed of the front wheels;

rear-wheel wheel speed obtaining means for obtaining a rear-wheel wheel speed substantially representing the wheel speed of the rear wheels;

slip value calculation means, operable when the braking operation is performed, for calculating a slip value on the basis of the obtained front-wheel wheel speed and rear-wheel wheel speed, the slip value corresponding to the degree of slippage of the rear wheels with respect to the front wheels; and control signal generation means for generating the control signal in such a manner that the ratio of the braking force applied to the rear wheels to the braking force applied to the front wheels decreases in accordance with the calculated slip value, wherein, the front-wheel wheel speed obtaining means includes:

front-wheel angular speed detection means for detecting angular speed of the left front wheel and angular speed of the right front wheel;

front-wheel tire temperature detection means for detecting internal temperature of the tire of the left front wheel and internal temperature of the tire of the right front wheel;

front-wheel tire temperature condition determination means for determining whether each of the detected internal temperature of the tire of the left front wheel and the detected internal temperature of the tire of the right front wheel satisfies a predetermined temperature condition for the front wheels; and front-wheel wheel speed calculation means for calculating the wheel speed of the front wheels on the basis of the angular speeds of the left and right front wheels when both the detected internal temperatures of the tires of the left and right front wheels satisfy the temperature condition for the front wheels, and for calculating the wheel speed of the front wheels on the basis of the angular speed of one wheel which satisfies the temperature condition for the front wheels without consideration of the angular speed of the other wheel which fails to satisfy the temperature condition for the front wheels when only one of the detected internal temperatures of the tires of the left and right front wheels satisfies the temperature condition for the front wheels, and the rear-wheel wheel speed obtaining means includes:

rear-wheel angular speed detection means for detecting angular speed of the left rear wheel and angular speed of the right rear wheel;

rear-wheel tire temperature detection means for detecting internal temperature of the tire of the left rear wheel and internal temperature of the tire of the right rear wheel;

rear-wheel tire temperature condition determination means for determining whether each of the detected internal temperature of the tire of the left rear wheel and the detected internal temperature of the tire of the right rear wheel satisfies a predetermined temperature condition for the rear wheels; and rear-wheel wheel speed calculation means for calculating the wheel speed of the rear wheels on the basis of the angular speeds of the left and right rear wheels when both the detected internal temperatures of the tires of the left and right rear wheels satisfy the temperature condition for the rear wheels, and for calculating the wheel speed of the rear wheels on the basis of the angular speed of one wheel which satisfies the temperature condition for the rear wheels without consideration of the angular speed of the other wheel which fails to satisfy the temperature condition for the rear wheels when only one of the detected internal temperatures of the tires of the left and right rear wheels satisfies the temperature condition for the rear wheel.

When the travel of the vehicle is continued in a state in which the air pressure of a tire has dropped, in some case, a large distortion is generated in a side wall portion thereof, with the result that the tire bursts. This phenomenon often occurs because of an extreme increase in the temperature of the side wall portion where the large distortion is generated. In the case where the internal temperature of a tire does not satisfy the predetermined temperature condition (the temperature condition for the front wheels and the temperature condition for the rear wheels) as described above, the present apparatus excludes, from the data used for calculation of the slip value, information (e.g., angular speed) regarding a wheel corresponding to such a tire which is in an instable state, calculates the front-wheel wheel speed and the rear-wheel wheel speed by use of only the angular speeds of the wheels to which the remaining tires are attached, and obtains the slip value from the calculated front-wheel and rear-wheel wheel speeds. Accordingly, since the slip value can be obtained more accurately, the EBD control is performed at more proper timing.

The present invention further provides a braking force distribution method for a vehicle, comprising:

detecting angular speed of a front wheel of the vehicle;

detecting internal pressure of the tire of the front wheel;

calculating, as front-wheel wheel speed, peripheral speed of the tire of the front wheel on the basis of the detected angular speed of the front wheel and the detected internal pressure of the tire of the front wheel;

detecting angular speed of a rear wheel of the vehicle;

detecting internal pressure of the tire of the rear wheel;

calculating, as rear-wheel wheel speed, peripheral speed of the tire of the rear wheel on the basis of the detected angular speed of the rear wheel and the detected internal pressure of the tire of the rear wheel;

calculating, when a braking operation is performed, a slip value on the basis of the calculated front-wheel wheel speed and rear-wheel wheel speed, the slip value corresponding to the degree of slippage of the rear wheel with respect to the front wheel;

generating a control signal in such a manner that the ratio of the braking force applied to the rear wheel to the braking force applied to the front wheel decreases in accordance with the calculated slip value; and applying to the front wheel of the vehicle a braking force corresponding to the braking operation, and applying to the rear wheel of the vehicle a braking force corresponding to the braking operation and the generated control signal.

By virtue of this configuration, the wheel speed of the front wheel and the wheel speed of the rear wheel, each of which is the peripheral speed of the corresponding tire, are calculated on the basis of not only the angular speeds of the respective wheels, but also the tire internal pressures of the respective wheels; i.e., in accordance with the dynamic load radiuses of the respective wheels. Thus, the wheel speed of the front wheel and the wheel speed of the rear wheel can be calculated more accurately. Accordingly, the "slip value indicating the degree of slippage of the rear wheel with respect to the front wheel", which is calculated from these wheel speeds, becomes more accurate. As a result, the braking force distribution control is performed at more proper timing, and locking of the rear wheel prior to that of the front wheel can be avoided more reliably.

Preferably, the braking force distribution method of the present invention further comprises:

setting, in response to an external operation signal, values corresponding to the tire internal pressure of the front wheel and the tire internal pressure of the rear wheel, respectively, as a reference tire pressure of the front wheel and a reference tire pressure of the rear wheel;

calculating a value indicative of a change in dynamic load radius of the tire of the front wheel on the basis of a deviation of the detected tire internal pressure of the front wheel from the reference tire pressure of the front wheel, and calculating the wheel speed of the front wheel on the basis of the detected angular speed of the front wheel and the calculated value indicative of the change in dynamic load radius of the tire of the front wheel;

calculating a value indicative of a change in dynamic load radius of the tire of the rear wheel on the basis of a deviation of the detected tire internal pressure of the rear wheel from the reference tire pressure of the rear wheel, and calculating the wheel speed of the rear wheel on the basis of the detected angular speed of the rear wheel and the calculated value indicative of the change in dynamic load radius of the tire of the rear wheel; and calculating the slip value on the basis of the calculated wheel speed of the front wheel and the calculated wheel speed of the rear wheel.

As described above, when a value indicative of a change in dynamic load radius of a tire is calculated on the basis of the deviation of the tire internal pressure of the wheel from the reference tire pressure set for the wheel, a value accurately representing the change in dynamic load radius of the tire can be obtained irrespective of the type of the tire or the like. Accordingly, when the wheel speed of the wheel is obtained on the basis of the value indicative of the change in the dynamic load radius of the tire and the angular speed of the wheel, the obtained wheel speed is close to the accurate value. Therefore, according to this braking force distribution method, the slip value can be calculated more accurately, so that the braking force distribution control is performed at more proper timing. Thus, locking of the rear wheel prior to that of the front wheel can be avoided more reliably.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENTS

Braking force distribution apparatuses according to embodiments of the present invention will be described with reference to the drawings.

First Embodiment

Figure 1:
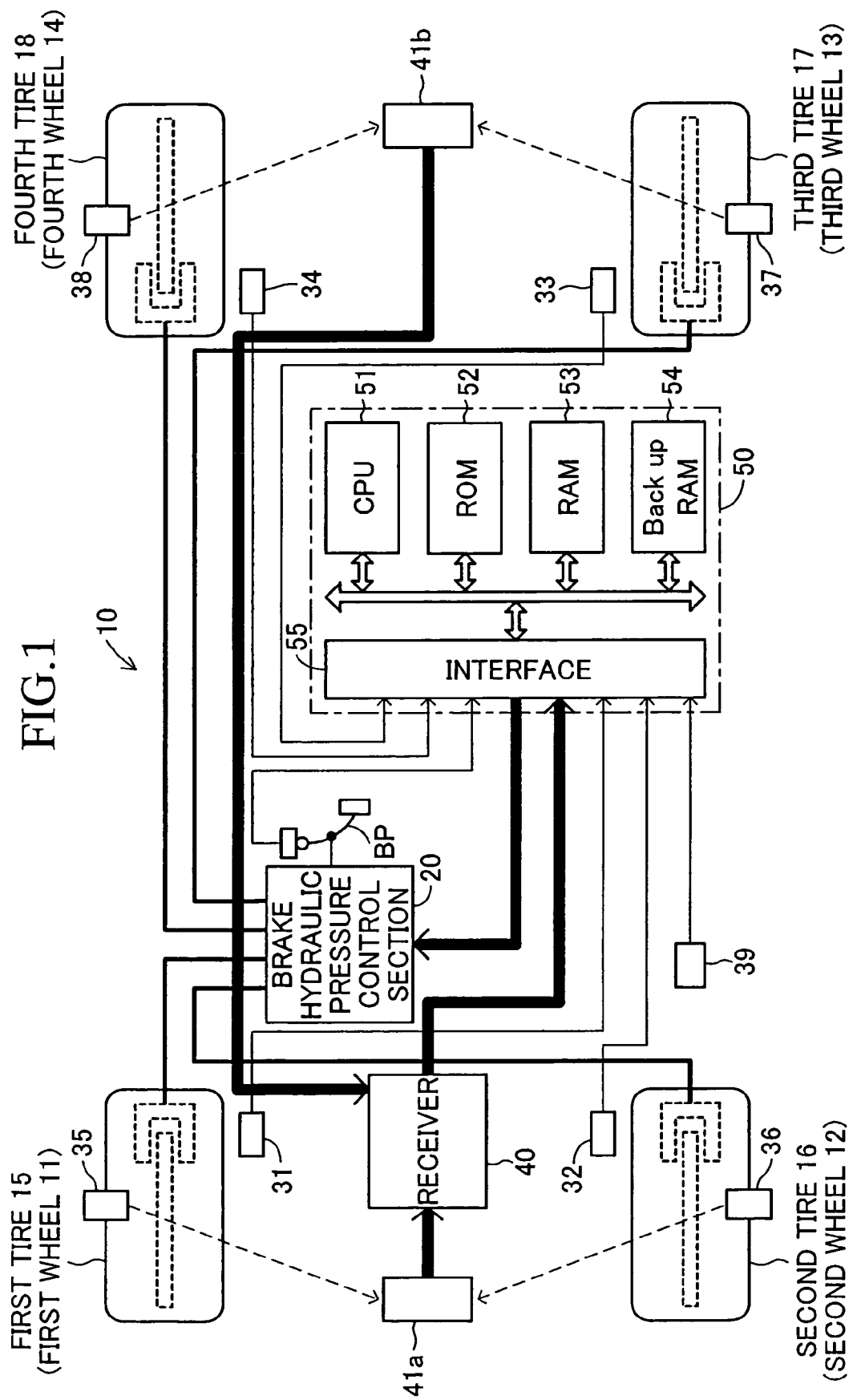
FIG. 1 is a schematic diagram of a braking force distribution apparatus according to a first embodiment of the present invention.

First, a braking force distribution apparatus according to a first embodiment will be described with reference to the drawings. FIG. 1 schematically shows the structure of a vehicle equipped with a braking force distribution apparatus 10 according to the present embodiment.

The vehicle has a first wheel 11 (front right wheel) and a second wheel 12 (front left wheel), which are disposed at front right and front left portions of the vehicle, respectively, and a third wheel 13 (rear left wheel) and a fourth wheel 14 (rear right wheel), which are disposed at rear left and rear right portions of the vehicle, respectively. First to fourth tires 15 to 18 are attached to the first through fourth wheels 11 to 14, respectively. The first wheel 11 and the second wheel 12 are drive wheels. The third wheel 13 and the fourth wheel 14 are non-drive wheels (follower wheels).

The braking force distribution apparatus 10 includes a brake hydraulic pressure control section 20 for generating a braking force in each wheel by means of brake hydraulic pressure; first to fourth wheel speed sensors 31 to 34; first through forth pressure sensors 35 to 38 of direct pressure type; an operation switch 39 to be operated for setting, as a reference pressure, an internal pressure of each tire at a predetermined time; a receiver 40 for receiving signals output from the pressure sensors via reception antenna 41a and 41b; and an electronic controller 50.

Figure 2:
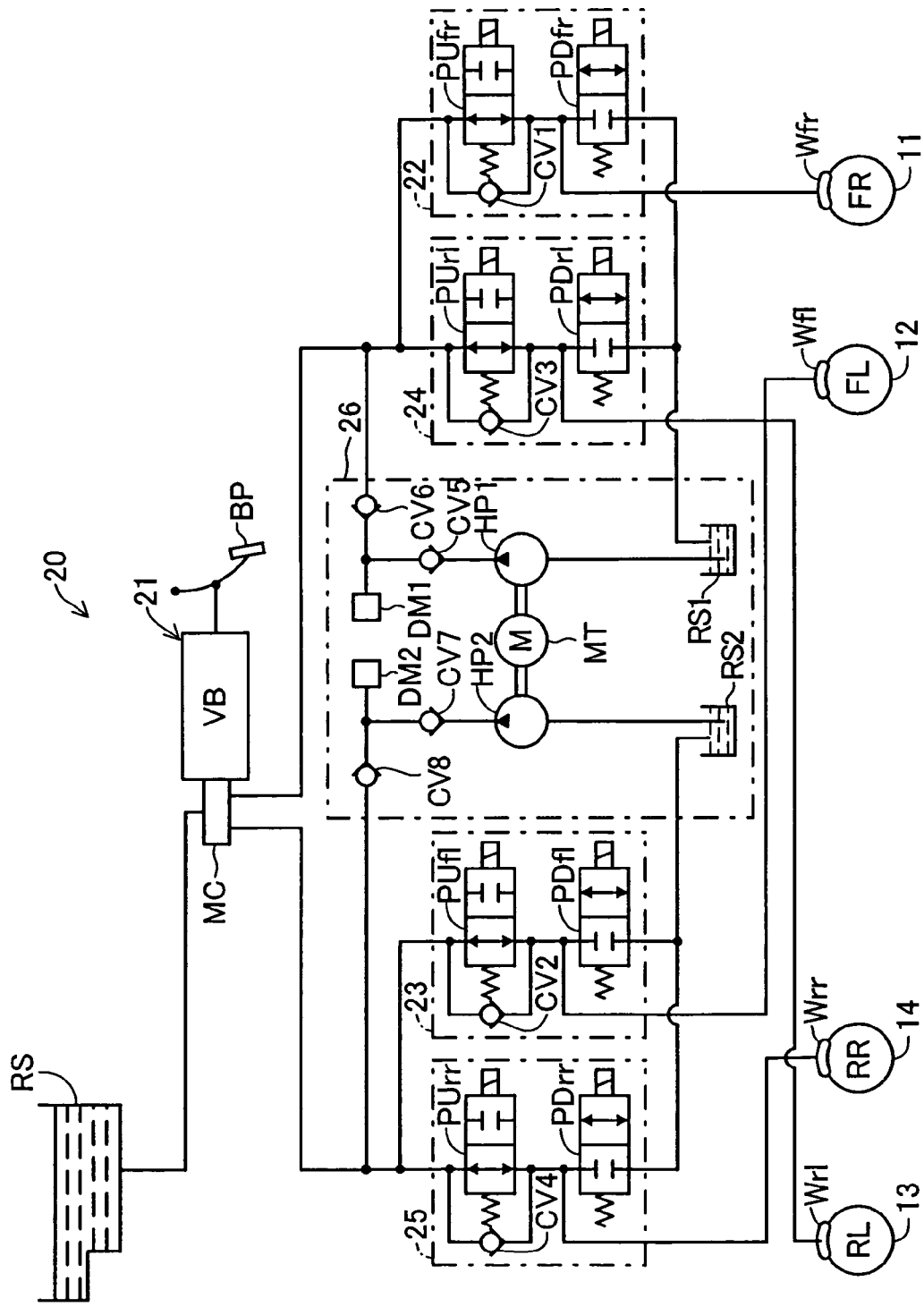
FIG. 2 is a schematic diagram of the brake hydraulic pressure control section shown in FIG. 1.

As schematically shown in FIG. 2, the brake hydraulic pressure control section 20 includes a brake hydraulic pressure generating section 21 which generates brake hydraulic pressure corresponding to the operating force of a brake pedal BP; an FR brake hydraulic pressure adjusting section 22, an FL brake hydraulic pressure adjusting section 23, an RL brake hydraulic pressure adjusting section 24, and an RR brake hydraulic pressure adjusting section 25, which can adjust the brake hydraulic pressures supplied to corresponding wheel cylinders Wfr, Wfl, Wrl, and Wrr respectively installed on the first through fourth wheels 11 to 14; and a return brake fluid supply section 26.

The brake hydraulic pressure generating section 21 includes a vacuum booster VB which operates in response to operation of the brake pedal BP, and a master cylinder MC which is linked to the vacuum booster VB. The vacuum booster VB utilizes the pressure (negative pressure) of air within the intake pipe of an unillustrated engine so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure corresponding to the boosted operating force. The master cylinder MC also generates from the second port a second master cylinder hydraulic pressure which is substantially the same as the first master cylinder hydraulic pressure and which corresponds to the boosted operating force.

The first port of the master cylinder MC is connected to the upstream side of the FR brake hydraulic pressure adjusting section 22 and the upstream side of the RL brake hydraulic pressure adjusting section 24. Thus, the first master cylinder hydraulic pressure is supplied to the upstream side of the FR brake hydraulic pressure adjusting section 22 and the upstream side of the RL brake hydraulic pressure adjusting section 24. Similarly, the second port of the master cylinder MC is connected to the upstream side of the FL brake hydraulic pressure adjusting section 23 and the upstream side of the RR brake hydraulic pressure adjusting section 25. Thus, the second master cylinder hydraulic pressure is supplied to the upstream side of the FL brake hydraulic pressure adjusting section 23 and the upstream side of the RR brake hydraulic pressure adjusting section 25.

The FR brake hydraulic pressure adjusting section 22 consists of a pressure-increasing valve PUfr, which is a normally-open solenoid valve of a 2-port, 2-position type, and a pressure-reducing valve PDfr, which is a normally-closed solenoid valve of a 2-port, 2-position type.

When the pressure-increasing valve PUfr is in its first position (a position in a non-excited state) shown in FIG. 2, it establishes communication between the upstream side of the FR brake hydraulic pressure adjusting section 22 and the wheel cylinder Wfr. When the pressure-increasing valve PUfr is in its second position (a position in an excited state), it breaks the communication between the upstream side of the FR brake hydraulic pressure adjusting section 22 and the wheel cylinder Wfr.

When the pressure-reducing valve PDfr is in its first position (a position in a non-excited state) shown in FIG. 2, it breaks communication between the wheel cylinder Wfr and a reservoir RS1. When the pressure-reducing valve PDfr is in its second position (a position in an excited state), it establishes the communication between the wheel cylinder Wfr and the reservoir RS1.

With this structure, when the pressure-increasing valve PUfr and the pressure-reducing valve PDfr are in their first positions, the hydraulic pressure in the wheel cylinder Wfr is increased since the pressurized brake fluid from the upstream side of the FR brake hydraulic pressure adjusting section 22 is supplied into the wheel cylinder Wfr. When the pressure-increasing valve PUfr is in the second position and the pressure-reducing valve PDfr is in the first position, regardless of the hydraulic pressure in the upstream side of the FR brake hydraulic pressure adjusting section 22, the hydraulic pressure in the wheel cylinder Wfr at the time of changeover is maintained (held). When the pressure-increasing valve PUfr and the pressure-reducing valve PDfr are in their second positions, the brake fluid within the wheel cylinder Wfr is allowed to return to the reservoir RS1, whereby the hydraulic pressure in the wheel cylinder Wfr is decreased.

A check valve CV1 which allows flow of the brake fluid in only one direction from the wheel cylinder Wfr side to the upstream side of the FR brake hydraulic pressure adjusting section 22 is connected in parallel with the pressure-increasing valve PUfr. As a result, when the brake pedal BP is released after being operated, the brake hydraulic pressure in the wheel cylinder Wfr is rapidly decreased by the action of the check valve CV1.

Similarly, the FL brake hydraulic pressure adjusting section 23, the RL brake hydraulic pressure adjusting section 24, and the RR brake hydraulic pressure adjusting section 25 comprise a pressure-increasing valve PUfl and a pressure-reducing valve PDfl, a pressure-increasing valve PUrl and a pressure-reducing valve PDrl, and a pressure-increasing valve PUrr and a pressure-reducing valve PDrr, respectively. By controlling the positions of each pressure-increasing valve and pressure-reducing valve, the brake hydraulic pressure in the wheel cylinder Wfl, the wheel cylinder Wri, and the wheel cylinder Wrr can be increased, maintained, or decreased. Checks valves CV2, CV3, and CV4 are provided in parallel with the pressure-increasing valves PUfl, PUrl, and PUrr, respectively, to provide the same function as that of the check valve CV1.

The return brake fluid supply section 26 includes a DC motor MT, and two hydraulic pumps HP1 and HP2 simultaneously driven by the motor MT. The hydraulic pump HP1 pumps the brake fluid returned from the pressure reducing valves PDfr and PDrl to the reservoir RS1, and supplies the pumped brake fluid to the upstream sides of the FR brake hydraulic pressure adjusting section 22 and the RL brake hydraulic pressure adjusting section 24 via check valves CV5 and CV6.

Similarly, the hydraulic pump HP2 pumps the brake fluid returned from the pressure reducing valves PDfl and PDrr to the reservoir RS2, and supplies the pumped brake fluid to the upstream sides of the FL brake hydraulic pressure adjusting section 23 and the RR brake hydraulic pressure adjusting section 25 via check valves CV7 and CV8.

With the structure described above, when all the solenoid valves are in their first positions, the brake hydraulic pressure control section 20 supplies to each wheel cylinder a brake hydraulic pressure corresponding to the operating force of the brake pedal BP (braking operation by the driver, braking operation quantity).

The brake hydraulic pressure control section 20 can individually control the brake hydraulic pressure in the wheel cylinder of each wheel. The brake hydraulic pressure control section 20 can decrease by a prescribed amount, hold, or increase by a prescribed amount only the brake hydraulic pressure in, for example, the wheel cylinder Wfr through control of the pressure-increasing valve PUfr and the pressure-reducing valve PDfr.

Next, the first through fourth wheel speed sensors 31 to 34 shown in FIG. 1 will be described. These wheel speed sensors detect changes in voltages of coils corresponding to changes in magnetic fields, which are produced through rotation of unillustrated sensor rotors attached to the rotary shafts of the first through fourth wheels 11 to 14, respectively, and output the voltage changes as speed signals indicative of angular speeds $\omega 1$ to $\omega 4$ of the first through fourth wheels 11 to 14.

The first through fourth wheel pressure sensors 35 to 38 are attached to tire valve holes of rims of the first through fourth wheels 11 to 14, respectively. Each of the first through fourth wheel pressure sensors 35 to 38 includes a pressure sensor for sensing the internal pressure $P(n)$ of the corresponding tire, a temperature sensor for sensing the internal temperature $T(n)$ of the corresponding tire, and a transmitter. Each of the transmitters provided in the first through fourth wheel pressure sensors 35 to 38 transmits the internal pressure $P(n)$ as a pressure signal, and the internal temperature $T(n)$ as a temperature signal. The variable "n" indicates the number of a wheel and a tire to be subjected to the later described processing. For example, the internal pressure of the first tire 15 is represented by $P(1)$.

The first pressure sensor 35 and the second pressure sensor 36 correspond to the front-wheel tire pressure detection means for detecting the internal pressures $P(1)$ and $P(2)$ of the first tire 15 and the second tire 16, and correspond to the front-wheel tire temperature detection means for detecting the internal temperatures $T(1)$ and $T(2)$ of the first tire 15 and the second tire 16. Similarly, the third pressure sensor 37 and the fourth pressure sensor 38 correspond to the rear-wheel tire pressure detection means for detecting the internal pressures $P(3)$ and $P(4)$ of the third tire 17 and the fourth tire 18, and correspond to the rear-wheel tire temperature detection means for detecting the internal temperatures $T(3)$ and $T(4)$ of the third tire 17 and the fourth tire 18.

Referring back to FIG. 1, the operation switch 39 is disposed in the vehicle compartment. When a service person at, for example, a service shop or a vehicle occupant exchanges a tire, he or she operates the operation switch 39 in order to instruct to set, as a reference pressure, the pressure of the tire regulated to a standard pressure. In response to the operation, the operation switch 39 outputs an operation signal for setting an internal pressure $PS(n)$, serving as a reference pressure for the n-th tire.

The receiver 40 receives, via the reception antenna 41a provided at a generally central portion (in the transverse direction) of a front portion of the vehicle, the pressure signals and temperature signals transmitted from the first pressure sensor 35 and the second pressure sensor 36.

Further, the receiver 40 receives, via the reception antenna 41*b* provided at a generally central portion (in the transverse direction) of a rear portion of the vehicle, the pressure signals and temperature signals transmitted from the third pressure sensor 37 and the fourth pressure sensor 38.

The electronic controller 50 is a microcomputer which is mainly composed of a CPU 51, ROM 52, RAM 53, backup RAM 54, and an input-output circuit (interface 55), which are mutually connected via a bus.

The electronic controller 50 is connected to the wheel speed sensors 31 to 34, the operation switch 39, the receiver 40, and the brake pedal BP. The electronic controller 50 receives the speed signals output from the wheel speed sensors, the operation signal output from the operation switch 39, the pressure signals and temperature signals output from the receiver 40, and the signal indicting the pressing force applied to the brake pedal BP. The electronic controller 50 is also connected to the brake hydraulic pressure control section 20. In accordance with instructions from the CPU 51, the electronic controller 50 sends to the brake hydraulic pressure control section 20 control signals for driving the solenoid valves PUfr, PDfr, PUfl, PDfl, PUrr, PDrr, PUrl, and PDrl, and the motor MT.

Next, operation of the braking force distribution apparatus 10 having the above-described configuration will be described for various cases. During periods in which the vehicle is stopped, the CPU 51 of the electronic controller 50 repeatedly executes, at predetermined intervals, a reference voltage setting routine (program) shown by the flowchart of FIG. 3. Further, during periods in which the vehicle is traveling, the CPU 51 repeatedly executes, at predetermined intervals, a main routine (program) for EBD control shown by the flowchart of FIG. 4.

(1) Case where the Vehicle is Stopped

Figure 3:
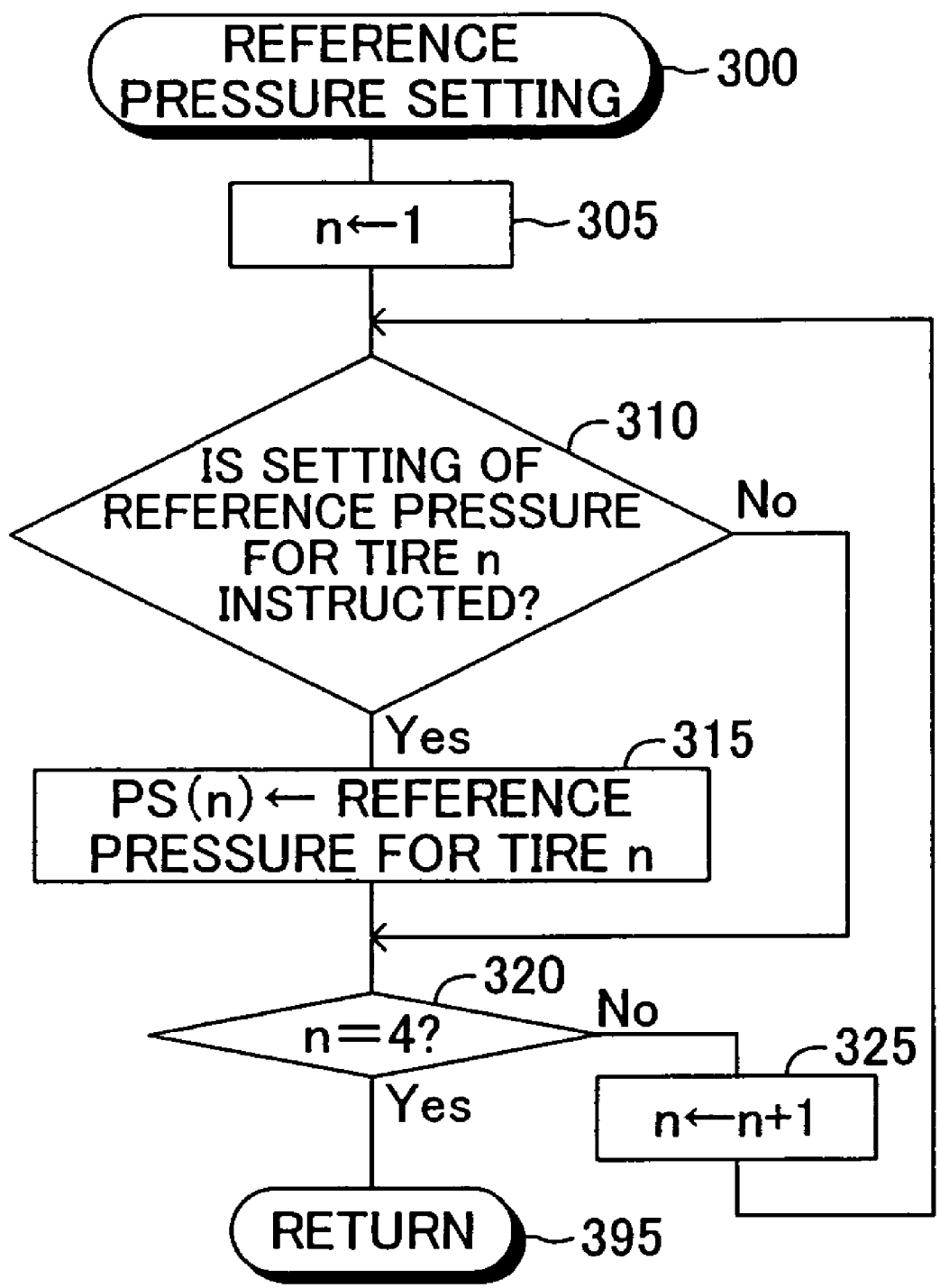
FIG. 3 is a flowchart showing a program executed for setting of reference pressures.

When a predetermined timing is reached, the CPU 51 starts the routine of FIG. 3 from Step 300, and proceeds to Step 305 so as to set "1" to the variable n. Subsequently, the CPU 51 proceeds to Step 310 so as to determine, on the basis of the operation signal output from the operation switch 39, whether setting of a reference pressure for the first tire 15 is instructed. When setting is instructed by a service person at a service shop, a vehicle occupant or a like person, the CPU 51 makes a "Yes" determination in Step 310, and proceeds to Step 315 so as to set, as a reference pressure PS(1), the internal pressure of the first tire 15 detected by means of the first pressure sensor 35. Subsequently, the CPU 51 proceeds to Step 320. In the case where the setting is not instructed at the time when the CPU 51 has proceeded to Step 310, the CPU 51 makes a "No" determination in Step 310, and then proceeds directly to Step 320. In this case, the reference pressure PS(1) is an initially set predetermined value or the value of the internal pressure of the first tire 15 detected previously when the setting was instructed by the service person, the vehicle occupant, or a like person.

Subsequently, the CPU 51 proceeds to Step 320 so as to determine whether the value of the variable is equal to 4. Since the value of the variable n is 1 at the present point in time, the CPU 51 makes a "No" determination in Step 320, and proceeds to Step 325 so as to add 1 to the variable n. Subsequently, the CPU 51 returns to Step 310. After that the CPU 51 repeats the processing of Steps 310 to 325 until the CPU 51 makes a "Yes" determination in Step 320. When the value of the variable n becomes 4, the CPU 51 makes a "Yes" determination in Step 320, and proceeds to Step 395 so as to end the current execution of the present routine. In this manner, the reference pressures PS(1) to PS(4) are set.

(2) Case where the vehicle is traveling, the first through fourth wheel speed sensors 31 to 34 are all normal, and the internal temperatures T(1) to T(4) of the first to fourth tires 15 to 18 are all normal (lower than the upper limit temperature)

(2-1) Case where the vehicle is traveling in an ordinary manner and the brake pedal BP is not operated, or case where the brake pedal BP is gently operated to a degree such that almost no difference is produced between the front-wheel wheel speed and the rear-wheel wheel speed.

Figure 4:
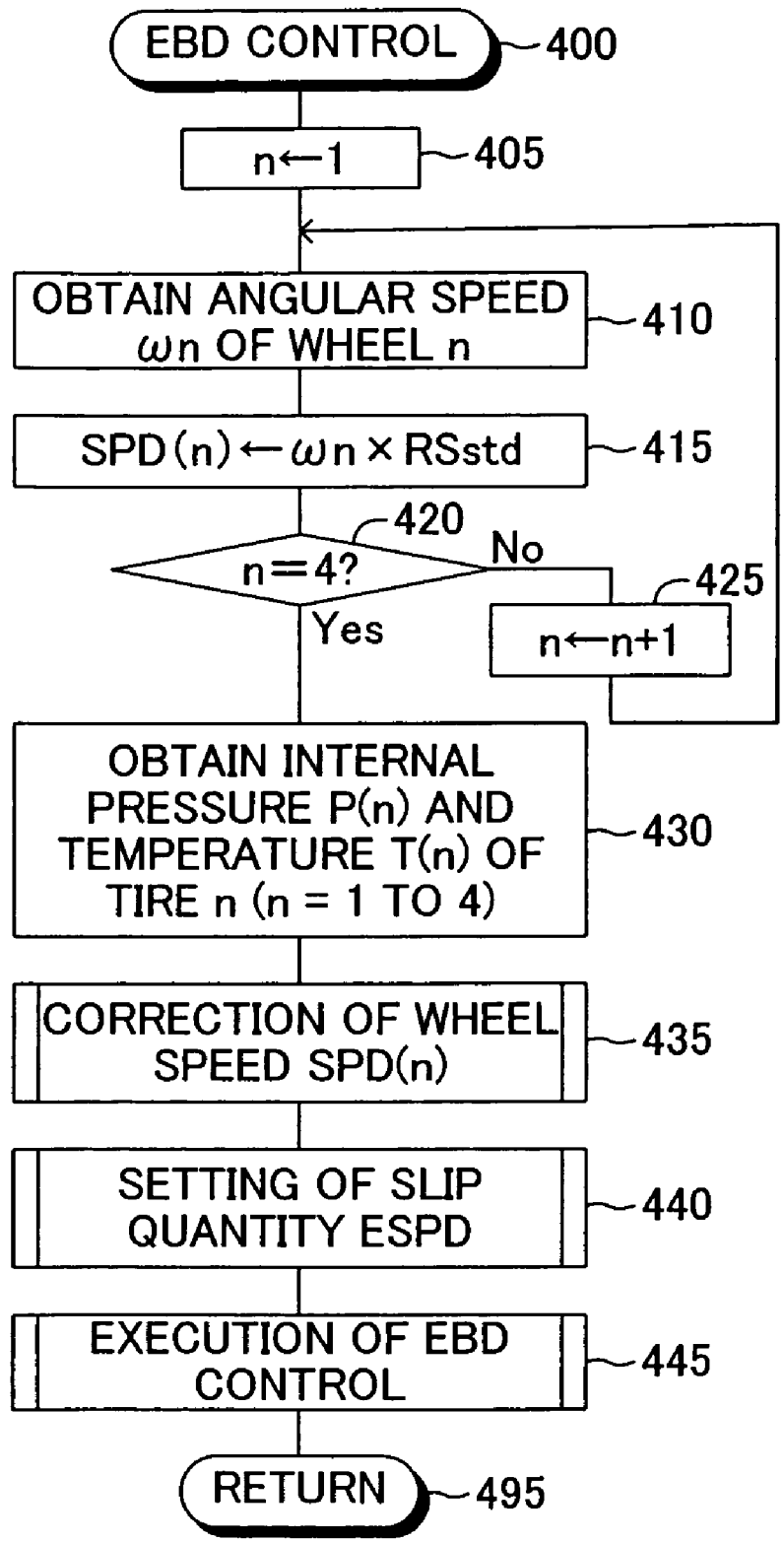
FIG. 4 is a flowchart showing a main program which the CPU shown in FIG. 1 executes in order to perform EBD control.

When a predetermined timing is reached, the CPU 51 starts the routine of FIG. 4 from Step 400, and proceeds to Step 405 so as to set "1" to the variable n.

Subsequently, the CPU 51 proceeds to Step 410 so as to obtain the angular speed $\omega 1$ of the first wheel 11 on the basis of the speed signal output from the first wheel speed sensor 31. In actuality, the electronic controller 50 includes a waveform shaping circuit, and converts the speed signal output from the first wheel speed sensor 31 to a pulse signal. Subsequently, by means of an unillustrated angular speed calculation routine executed at predetermined intervals, the CPU 51 calculates the angular speed $\omega 1$ on the basis of the number of pulses (the number of trailing edges or leading edges of the pulse signal) within a predetermined period of time. The CPU 51 fetches the currently calculated value of the angular speed $\omega 1$ in Step 410. Other angular speeds $\omega 2$ to $\omega 4$ are also obtained in the same manner as in the case of the angular speed $\omega 1$. Accordingly, the angular velocity detection means is formed by the first through fourth wheel speed sensors 31 to 34 and the angular velocity calculation routine.

Next, the CPU 51 proceeds to Step 415 so as to obtain the wheel speed SPD(1) of the first wheel 11 by multiplying the angular speed $\omega 1$ by a dynamic load radius RSstd. Here, RSstd represents a reference dynamic load radius of the tire which is previously determined in the stage of designing the vehicle. The reference dynamic load radius RSstd can be considered to be a dynamic load radius corresponding to a reference value PSstd of tire internal pressure required for tires of a type which is assumed to be used.

Subsequently, the CPU 51 proceeds to Step 420 so as to determine whether the value of the variable is equal to 4. Since the value of the variable n is 1 at the present point in time, the CPU 51 makes a "No" determination in Step 420, and proceeds to Step 425 so as to add 1 to the variable n. Subsequently, the CPU 51 returns to Step 410. After that the CPU 51 repeats the processing of Steps 410 to 425 until the CPU 51 makes a "Yes" determination in Step 420. When the value of the variable n becomes 4, the CPU 51 makes a "Yes" determination in Step 420, and proceeds to Step 430. In this manner, the wheel speeds SPD(1) to SPD(4) are obtained.

Next, in step 430 the CPU 51 receives from the receiver 40 the pressure signals indicating the internal pressures P(1) to P(4) of the first through fourth tires 15 to 18 and the temperature signals indicating the internal temperatures T(1) to T(4) of the first through fourth tires 15 to 18.

Figure 5:
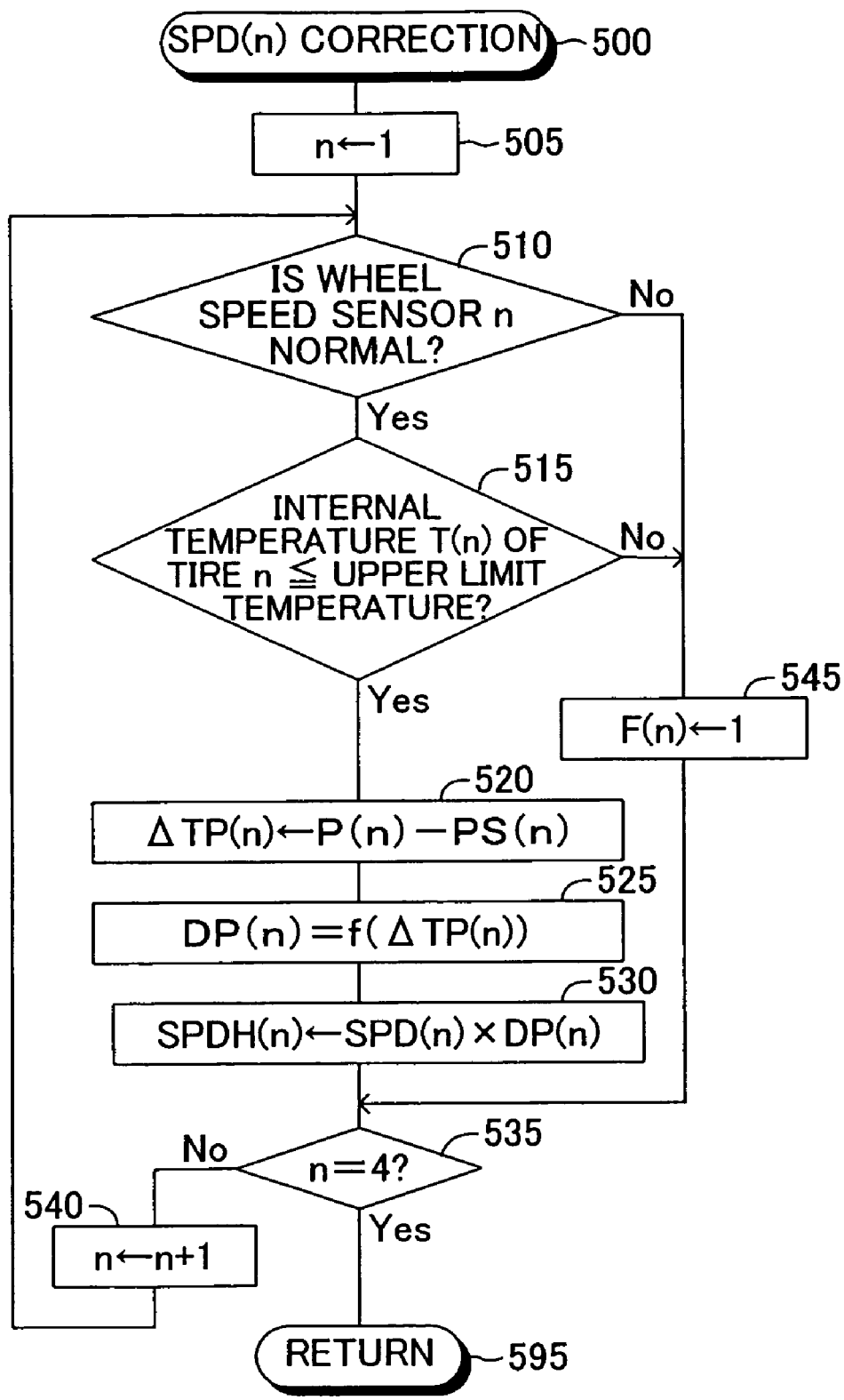
FIG. 5 is a flowchart showing a program which the CPU shown in FIG. 1 executes in order to correct wheel speeds.

Next, the CPU 51 proceeds to Step 435 so as to call a subroutine shown by the flowchart of FIG. 5 for correcting the wheel speed SPD(n).

The CPU 51 starts the called subroutine from Step 500, and proceeds to Step 505 so as to set "1" to the variable n. After that, the CPU 51 proceeds to Step 510 so as to determine whether the first wheel sensor 31 is normal. Under the above-described assumption (2), the first wheel sensor 31 is normal, and therefore, the CPU 51 makes a "Yes" determination in Step 510, and then proceeds to Step 515 so as to determine whether the internal temperature T(1) of the first wheel 15 is lower than a predetermined upper limit temperature.

Under the above-described assumption (2), the internal temperature T(1) of the first tire 15 is normal, and therefore, the CPU 51 makes a "Yes" determination in Step 515, and then proceeds to Step 520 so as to calculate a deviation ΔTP(1) of the internal pressure P(1) of the first wheel 15 from the reference pressure PS(1) of the first wheel 15 on the basis of the pressure signals. Subsequently, the CPU 51 proceeds to Step 525 so as to calculate a dynamic load radius change rate DP(1) (=R(1)/RS(1)) corresponding the deviation ΔTP(1) by substituting the deviation ΔTP(1) in (by applying ΔTP(1) to) a function f shown in the correlation map (Map 1) of FIG. 6, which shows the relation between tire internal pressure difference ΔTP(n) and dynamic load radius change rate DP(n). The dynamic load radius change rate DP(1) is an example of the value corresponding to a change in the dynamic load radius of the tire calculated on the basis of the deviation ΔTP(1).

Here, an additional description of the dynamic load radius change rate DP(1) will be provided. The correlation map (Map 2) of FIG. 7, which shows the relation between air pressure and dynamic load radius of a tire, shows a change amount ΔR(n) of the dynamic load radius R(n) from the dynamic load radius RS(n), the change amount corresponding to the deviation ΔTP(n) obtained in the above-described Step 520. The dynamic load radius of a tire refers to a value obtained by dividing a travel distance per rotation of the tire by 2π, the travel distance being measured in a state in which the vehicle is caused to travel at a constant speed while a specified load is applied thereto. The correlation map (Map 2) was experimentally obtained. The value of the vertical axis of the correlation map (Map 2) is not the absolute value but the relative value of the dynamic load radius. In other words, the correlation map (Map 2) shows that the dynamic load radius R(n) of a tire and the internal pressure P(n) of the tire have a certain proportional relation therebetween irrespective of the type of the tire. On the basis of the relation shown in the correlation map (Map 2), the relation between ΔTP(n) and the dynamic load radius change rate DP(n) can be obtained. This relation is represented by the function f shown in the correlation map (Map 1) of FIG. 6.

Next, the CPU 51 proceeds to Step 530, and calculates a wheel speed SPDH(1) for calculation of a slip value (hereinafter referred to as the "slip-value calculation wheel speed SPDH(1)") by multiplying the thus-obtained dynamic load radius change rate DP(1) by the wheel speed SPD(1) (by correcting the wheel speed SPD(1) with the dynamic load radius change rate DP(1)). As a result, the slip-value calculation wheel speed SPDH(1) becomes a value considerably close to the true wheel speed of the first wheel 11 (peripheral speed of the first tire 15).

Subsequently, the CPU 51 proceeds to Step 535 so as to determine whether the value of the variable is equal to 4. Since the value of the variable n is 1 at the present point in time, the CPU 51 makes a "No" determination in Step 535, and proceeds to Step 540 so as to add 1 to the variable n. Subsequently, the CPU 51 returns to Step 510.

Under the above-described assumption (2), the second to fourth wheel speed sensors 32 to 34 are normal, and the internal temperatures T(2) to T(4) of the second to fourth tires 16 to 18 are normal. Therefore, the CPU 51 repeats the processing of Steps 510 to 540 until the CPU 51 makes a "Yes" determination in Step 535. When the value of the variable n becomes 4, the CPU 51 makes a "Yes" determination in Step 535, and proceeds to Step 595. Thus, the processing of the present subroutine ends and is not performed until the present subroutine is called in the main routine. In this manner, slip-value calculation wheel speeds SPDH(1) to SPDH(4) are obtained.

Figure 8:
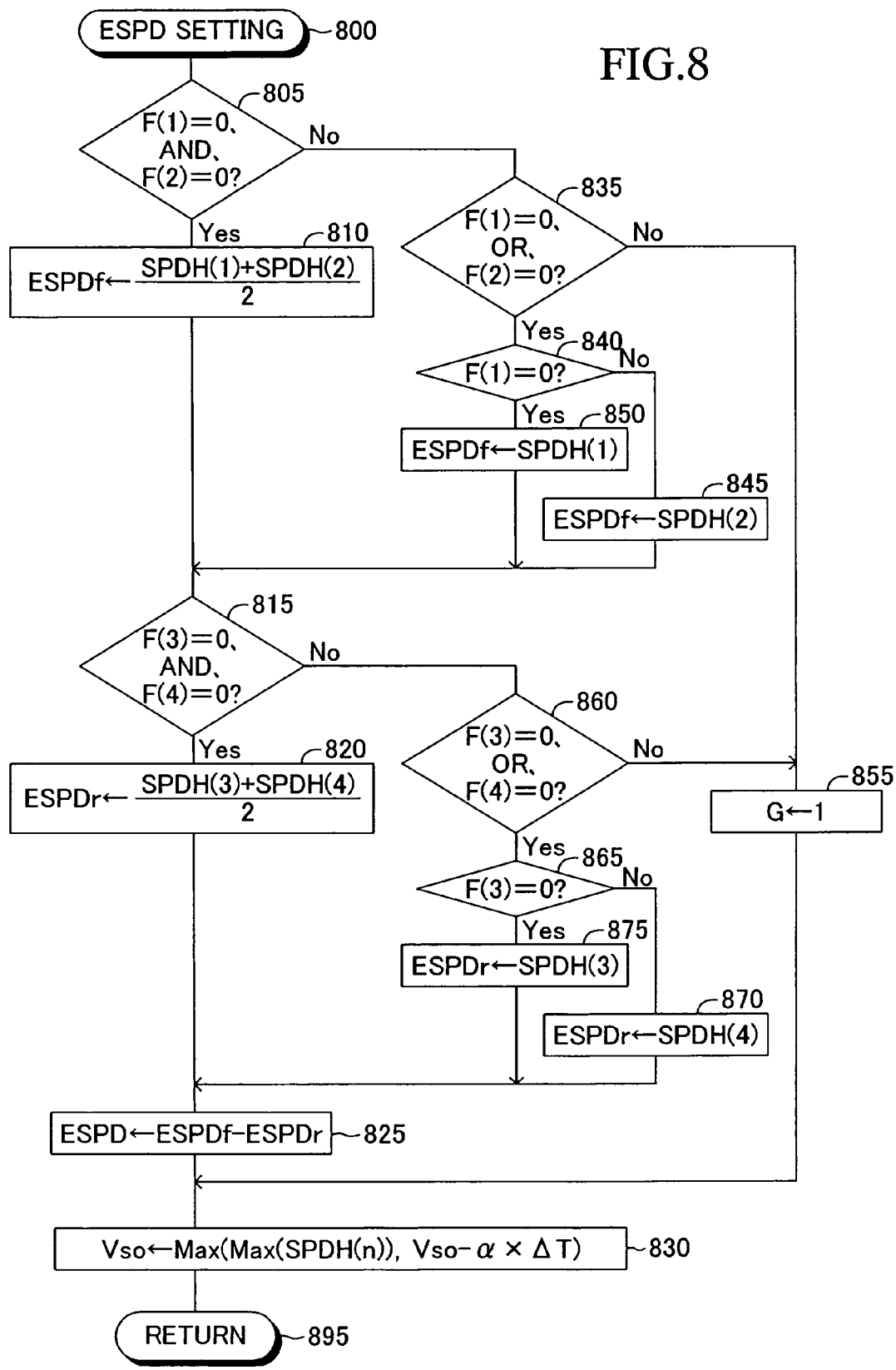
FIG. 8 is a flowchart showing a program which the CPU shown in FIG. 1 executes in order to set a slip value.

Next, the CPU 51 proceeds to Step 440 of the main routine, which is the return point, and calls a slip value ESPD setting subroutine. FIG. 8 is a flowchart showing the subroutine (program) which the CPU 51 executes so as to set a slip value ESPD.

The CPU 51 starts the subroutine from Step 800, and proceeds to Step 805 so as to determine whether both determination flags F(1) and F(2) have been set to 0.

The determination flags F(1) to F(4) are used to determine whether the wheel speeds SPD(1) to SPD(4) of the first through fourth wheels 11 to 14 are used for calculation of the slip value ESPD. The determination flag F(n) (n is an integer of 1 to 4) represents that the wheel speed SPD(n) of the wheel n is used in the calculation of the slip value ESPD when its value is 0, and represents that the wheel speed SPD(n) of the wheel n is not used in the calculation of the slip value ESPD when its value is 1.

Further, the determination flag F(n) is set to 0 in an initialization routine, and, as described later, it is set to 1, when the wheel speed sensor of the wheel n is anomalous or when the internal temperature T(n) of the tire n is equal to or higher than the upper limit value.

Under the above-described assumption (2), the second to fourth wheel speed sensors 32 to 34 are normal, and the internal temperatures T(2) to T(4) of the second to fourth tires 16 to 18 are normal. Therefore, all the determination flags F(1) to F(4) have been set to 0. Accordingly, the CPU 51 makes a "Yes" determination in Step 805, and proceeds to Step 810 so as to calculate, as a front-wheel wheel speed (wheel speed of the front wheels) ESPDf, an average between the slip-value calculation wheel speed SPDH(1) of the first wheel 11 and the slip-value calculation wheel speed SPDH(2) of the second wheel 12.

Subsequently, The CPU 51 proceeds to Step 815 so as to determine whether both determination flags F(3) and F(4) have been set to 0. As described previously, both the determination flags F(3) and F(4) have been set to 0. Accordingly, the CPU 51 makes a "Yes" determination in Step 815, and proceeds to Step 820 so as to calculate, as a rear-wheel wheel speed (wheel speed of the rear wheels) ESPDr, an average between the slip-value calculation wheel speed SPDH(3) of the third wheel 13 and the slip-value calculation wheel speed SPDH(4) of the fourth wheel 14. The CPU 51 then proceeds to Step 825 so as to calculate the slip value ESPD by subtracting the rear-wheel wheel speed ESPDr from the front-wheel wheel speed ESPDf.

Next, the CPU 51 proceeds to Step 830, and obtains an estimated vehicle body speed Vso of the vehicle. More specifically, the estimated vehicle body speed Vso is a lager one between the maximum value of the slip-value calculation wheel speed SPDH(n), for which the determination flag F(n) has been set to 0, (i.e., the maximum value of the slip-value calculation wheel speed SPDH(n) used for the calculation of the slip value ESPD), and a value which is obtained through subtraction, from the estimated vehicle body speed Vso calculated in the previous cycle, of a value obtained by multiplying the maximum decreasing gradient a of the vehicle body speed by the computation interval ΔT of the CPU 51. After having calculated the estimated vehicle body speed Vso in this manner, the CPU 51 proceeds to Step 895. Thus, the processing of the present subroutine ends and is not performed until the present subroutine is called in the main routine.

Figure 9:
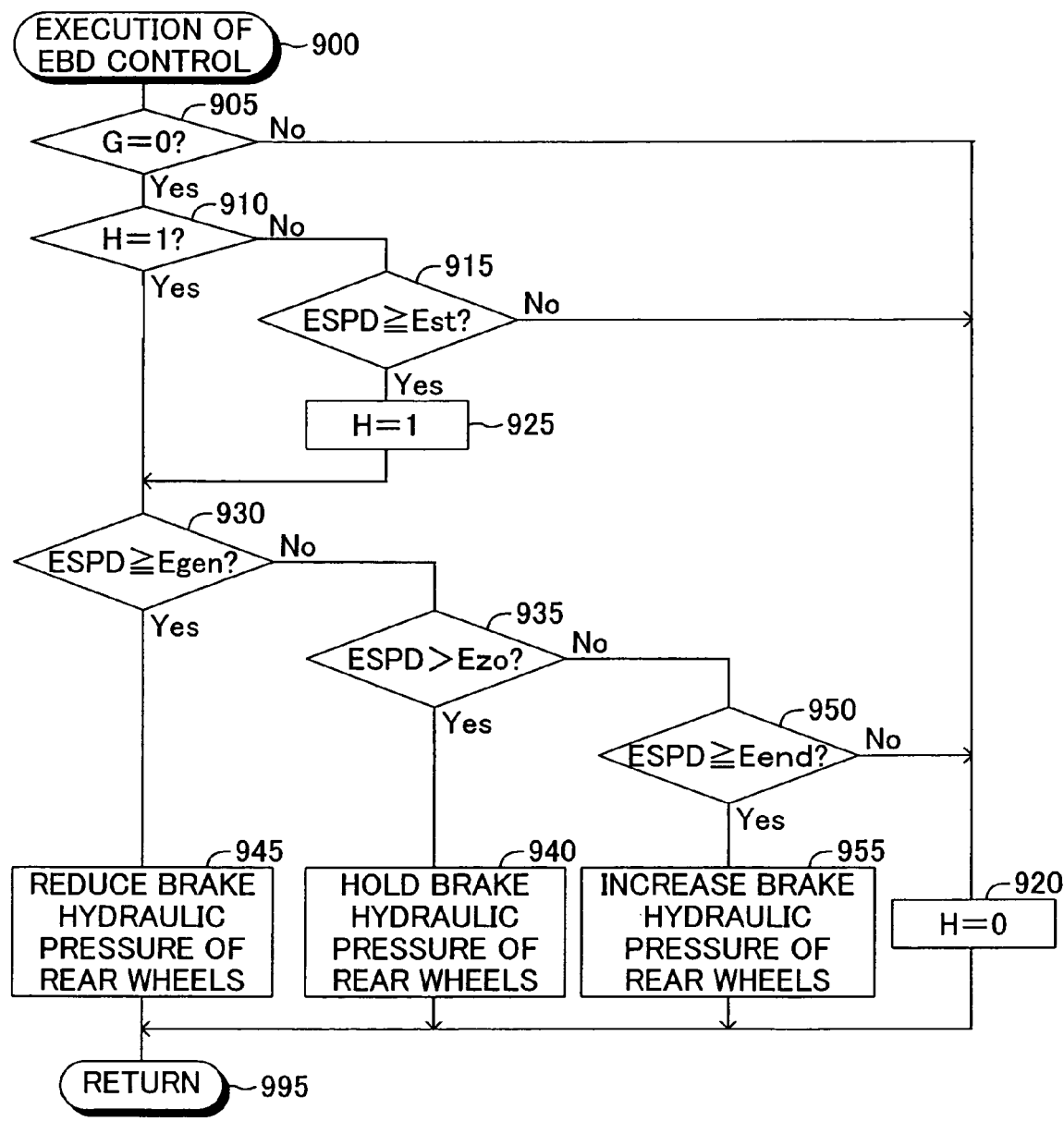
FIG. 9 is a flowchart showing a program which the CPU shown in FIG. 1 executes in order to control break hydraulic pressure of rear wheels by EBD control.

Next, the CPU 51 proceeds to Step 445 of the main routine, which is the return point, and calls an EBD control execution subroutine shown by the flowchart of FIG. 9.

The CPU 51 starts the subroutine from Step 900, and proceeds to Step 905 so as to determine whether the determination flag G has been set to 0.

The determination flag G is used to determine whether the slip value ESPD has been calculated. The determination flag G represents that the slip value ESPD has been calculated when its value is 0, and represents that the slip value ESPD has not yet been calculated when its value is 1.

The determination flag G is set to 0 in the initialization routine, and is set to 1 in any one of the following cases:

the case where the wheel speed sensor 31 of the first wheel 11 is anomalous or the internal temperature T(1) of the first tire 15 is higher than the upper limit temperature and the wheel speed sensor 32 of the second wheel 12 is anomalous or the internal temperature T(2) of the second tire 16 is higher than the upper limit temperature; and the case where the wheel speed sensor 33 of the third wheel 13 is anomalous or the internal temperature T(3) of the third tire 17 is higher than the upper limit temperature and the wheel speed sensor 34 of the fourth wheel 14 is anomalous or the internal temperature T(4) of the fourth tire 18 is higher than the upper limit temperature.

Under the above-described assumption (2), the first to fourth wheel speed sensors 31 to 34 are normal, and the internal temperatures T(1) to T(4) of the first to fourth tires 15 to 18 are normal. Therefore, the determination flag G has been set to 0. Accordingly, the CPU 51 makes a "Yes" determination in Step 905, and proceeds to Step 910 so as to determine whether a determination flag H has been set to 1.

The determination flag H is used to determine whether the EDB control is currently executed. The determination flag H represents that the EDB control is not currently executed when its value is 0, and represents that the EDB control is currently executed when its value is 1.

The determination flag H is set to 0 in the initialization routine and in Step 920, which will be described later, when the EDB control is not currently executed. The determination flag H is set to 1 in Step 925, which will be described later, when the EDB control is currently executed.

Since the EDB control is not executed at the present point in time, the value of the determination flag H is 0. Therefore, the CPU 51 makes a "No" determination in Step 910, and then proceeds to Step 915 so as to determine whether the calculated slip value ESPD is not less than a start slip value Est, which is a condition for starting the EBD control.

The start slip value Est is previously calculated by use of the estimated vehicle body speed Vso. More specifically, the start slip value Est is a value obtained by adding a fixed value S (which is a predetermined value; e.g., 1 km/h) to A% of the estimated vehicle body speed Vso (A is a predetermined value; e.g., 2%). Under the above-described assumption (2-1), the slip value ESPD is very small and is smaller than the start slip value Est. Therefore, the CPU 51 makes a "No" determination in Step 915, and proceeds to Step 920 so as to set 0 to the determination flag H. Subsequently, the CPU 51 proceeds to Step 995 so as to end the processing of the present subroutine, and does not execute the present subroutine until the present subroutine is called in the main routine. After that, the CPU 51 proceeds to Step 495 of the main routine, which is the return point, so as to end the current execution of the present routine.

After that, the CPU 51 repeats the above-described operation insofar as the slip value ESPD is less than the start slip value Est. As a result, the brake hydraulic pressure applied to the wheel cylinder of each wheel is controlled to a pressure corresponding to the operation amount of the brake pedal BP (braking operation). Accordingly, the braking force applied to the rear wheels and the braking force applied to the front wheels change while maintaining a predetermined mutual relation (in the present example, a constant relation).

(2-2) Case where the brake pedal BP is operated with a relatively strong force, and the difference between the front-wheel wheel speed and the rear-wheel wheel speed increases (case where the slip value ESPD becomes equal to or greater than the start slip value Est).

Figure 10:
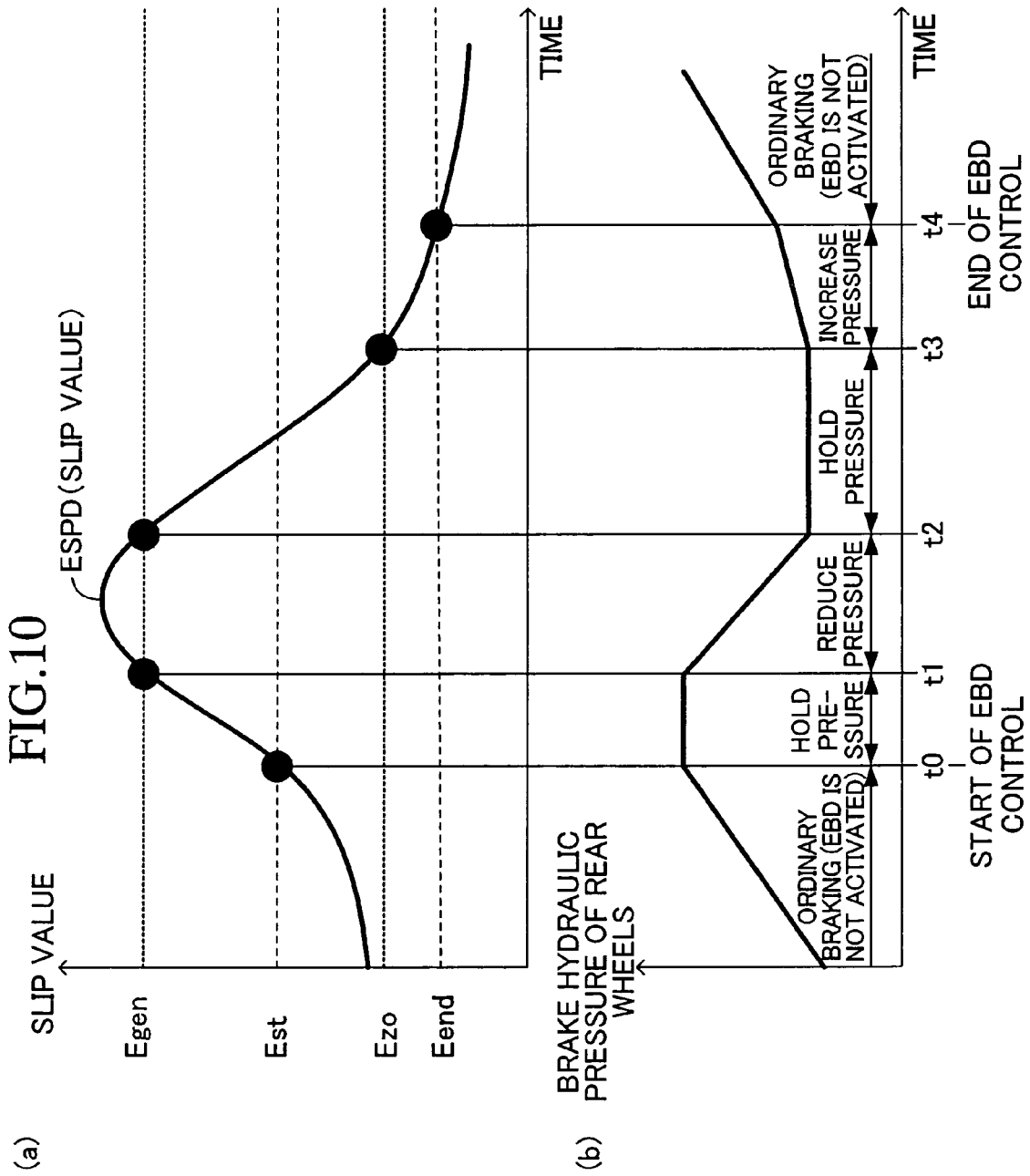
FIG. 10 is a pair of time charts showing change with time in the slip value (time chart (a)) and showing change with time in the state of control of break hydraulic pressure of the rear wheels (time chart (b))

When the brake pedal BP is operated with a relatively strong force, as shown in a region before time t0 of the time chart (a) of FIG. 10, the slip value ESPD gradually increases, and exceeds the start slip value Est at time t0. At this point in time, when the CPU 51 proceeds to Step 445 of FIG. 4, the CPU 51 makes a "Yes" determination in Step 915 subsequent to Steps 900 to 910 of FIG. 9, and then proceeds to Step 925 so as to set 1 to the determination flag H.

Subsequently, the CPU 51 proceeds to Step 930 so as to determine whether the slip value ESPD is not less than a pressure reduction slip value Egen. The pressure reduction slip value Egen is previously obtained by adding the previously-mentioned fixed value S to B% (e.g., 3%) of the estimated vehicle body speed Vso. The value of the pressure reduction slip value Egen is greater than the start slip value Est.

Since the present point in time is immediately after the slip value ESPD has exceeded the start slip value Est, the slip value ESPD is not greater than the pressure reduction slip value Egen. Therefore, the CPU 51 makes a "No" determination in Step 930, and then proceeds to Step 935 so as to determine whether the slip value ESPD is greater than a pressure increase slip value Ezo.

The pressure increase slip value Ezo is a value (Est>Ezo) previously obtained by adding the previously-mentioned fixed value S to C% (e.g., 1%) of the estimated vehicle body speed Vso. The value of the pressure increase slip value Ezo is smaller than the start slip value Est.

Since the slip value ESPD is greater than the start slip value Est at the present point in time, the slip value ESPD is greater than the pressure increase slip value Ezo. Therefore, the CPU 51 makes a "Yes" determination in Step 935, and then proceeds to Step 940 so as to control the brake fluid so as to hold the brake hydraulic pressure applied to the wheel cylinders of the third wheel 13 and the fourth wheel 14 (the left and right rear wheels). Subsequently, the CPU 51 proceeds to Step 995 so as to end the processing of the present subroutine, and does not execute the present subroutine until the present subroutine is called in the main routine.

Accordingly, as shown in the time chart (b) of FIG. 10, the EBD control is started at time t0, and the braking force applied to the left and right rear wheels is maintained at the level equal to that at time t0, whether the braking force applied to the left and right front wheels is increased or not.

In this case, the brake pedal BP is strongly depressed, the slip value ESPD increases further, and exceeds the pressure reduction slip value Egen at time t1. At that time, the CPU 51 makes a "Yes" determination in Step 910 subsequent to Steps 900 and 905 of the EBD control execution subroutine, and then proceeds to Step 930, in which the CPU 51 makes a "Yes" determination. As a result, the CPU 51 proceeds to Step 945 so as to control the brake fluid in such a manner that the brake hydraulic pressure applied to the wheel cylinders of the left and right rear wheels decreases. Subsequently, the CPU 51 proceeds to Step 995 so as to end the processing of the present subroutine, and does not execute the present subroutine until the present subroutine is called in the main routine.

As a result, as shown in the time chart (b) of FIG. 10, after time t1, the brake fluid within the wheel cylinders of the left and right rear wheels is controlled in such a manner that the brake hydraulic pressure decreases. With this operation, the braking force applied to the left and right rear wheels decreases. Accordingly, the ratio of the braking force applied to the left and right rear wheels to the braking force applied to the left and right front wheels decreases, whereby the slip value ESPD gradually decreases, and becomes smaller than the pressure reduction slip value Egen at time t2.

At this point in time, when the CPU 51 proceeds to Step 930, the CPU 51 makes a "No" determination in Step 930, and makes a "Yes" determination in Step 935, so that the CPU 51 proceeds Step 940 again. As a result, the brake hydraulic pressure within the wheel cylinders of the left and right rear wheels is maintained at the level equal to that at time t2. Since the brake hydraulic pressure at time t2 is sufficiently small, the slip value ESPD continue decreasing, and becomes smaller than the pressure increase slip value Ezo at time t3.

Therefore, when the time t3 has come, the CPU 51 makes a "No" determination in Steps 930 and 935, and proceeds to Step 950 for determining whether the slip value ESPD is not les than an end slip value Eend. At this point of time, the CPU 51 makes a "Yes" determination in Step 950, and then proceeds to 955 so as to control the brake fluid in such a manner that the brake hydraulic pressure applied to the wheel cylinders of the left and right rear wheels increases. Subsequently, the CPU 51 proceeds to Step 995 so as to end the processing of the present subroutine, and does not execute the present subroutine until the present subroutine is called in the main routine.

As a result, as shown in the time chart (b) of FIG. 10, after time t3, the brake fluid within the wheel cylinders of the left and right rear wheels is controlled in such a manner that the brake hydraulic pressure increases. With this operation, the ratio of the braking force applied to the left and right rear wheels to the braking force applied to the left and right front wheels approaches the predetermined value. Subsequently, the slip value ESPD gradually becomes smaller than the end slip value Eend at time t4.

Therefore, when time t4 has come, the CPU 51 makes a "No" determination in all of Steps 930, 935, and 950, and proceeds to 920 so as to set 0 to the determination flag H. Subsequently, the CPU 51 proceeds to Step 995 so as to end the processing of the present subroutine, and does not execute the present subroutine until the present subroutine is called in the main routine.

Accordingly, as shown in the time charts (a) and (b) of FIG. 10, the EBD control ends at time t4.

As described above, the braking force distribution apparatus 10 according to the present embodiment accurately obtains the slip value ESPD, which indicates the degree of slippage of the rear wheels with respect to the front wheels, on the basis of the front-wheel wheel speed and the rear-wheel wheel speed which are calculated in consideration of the internal pressure of each tire (i.e., the dynamic load radius of each tire), and compares the slip value ESPD with the start slip value Est. As a result, the EDB control is performed at more proper timing, whereby lock of the rear wheels prior to that of the front wheels can be avoided more reliably.

Notably, in the case where the slip value ESPD becomes equal to or greater than the start slip value Est during braking operation, and then gradually decreases without exceeding the pressure reduction slip value Egen, the CPU 51 proceeds Steps 940 and 955, without proceeding to Step 945, to thereby control the brake fluid so as to hold and increase the brake hydraulic pressure applied to the left and right rear wheels.

(3) Case where the Internal Temperature T(n) of the N-th Tire (Tire n) Exceeds the Predetermined Upper Limit Temperature when the Vehicle is Traveling (3-1) Case where Only the Internal Temperature T(1) of the First Tire 15 is Anomalous At predetermined timing, the CPU 51 calls the subroutine of FIG. 5 in Step 435, and proceeds to Step 515 subsequent to Steps 500 to 510. Since the internal temperature T(1) of the first tire 15 is assumed to be higher than the predetermined upper limit temperature, the CPU 51 makes a "No" determination in Step 515, and then proceeds to Step 545 so as to set 1 to the determination flag F(1). Subsequently, the CPU 51 returns to Step 510 via Steps 535 and 540. Since the internal temperatures T(2) to T(4) of the second to fourth tires 16 to 18 are all normal, the CPU 51 repeats the processing of Steps 510 to 540 until it makes a "Yes" determination in Step 535, and then end the current execution of the present subroutine.

The CPU 51 calls the subroutine of FIG. 8 at Step 440, which is the return point, starts the processing from Step 800, and then proceeds to Step 805. Since the value of the determination flag F(1) is 1, the CPU 51 makes a "No" determination in Step 805, and then proceeds to Step 835 so as to determine whether the determination flag F(1) or the determination flag F(2) has been set to 0. Under the above-described assumption (3-1), the second wheel speed sensor 32 and the internal temperature T(2) of the second tire 16 are both normal, and therefore, the determination flag F(2) has been set to 0 before this point in time. Therefore, the CPU 51 makes a "Yes" determination in Step 835, and proceeds to Step 840 so as to determine whether the value of the determination flag F(1) is 0.

Since the determination flag F(1) has been set to 1 as described above, the CPU 51 makes a "No" determination in Step 840, and proceeds to Step 845 so as to store, as the front-wheel wheel speed ESPDf, the slip-value calculation wheel speed SPDH(2) of the second wheel 12.

Subsequently, in Step 820 subsequent to Step 815, the CPU 51 stores, as the rear-wheel wheel speed ESPDr, the average of the slip-value calculation wheel speeds SPDH(3) and SPDH(4), and then proceeds to Step 825 so as to calculate the slip value ESPD. After that, the CPU 51 proceeds to Step 895 via Step 830 so as to end the current execution of the present subroutine.

Accordingly, the slip value ESPD is calculated more accurately on the basis of the slip-value calculation wheel speeds SPDH(2) to SPDH(4) of the second to fourth wheels 12 to 14, without use of the slip-value calculation wheel speed SPDH(1) of the first wheel 11 whose tire internal temperature is anomalous. As a result, the EBD control is executed at more proper timing in accordance with the slip value ESPD.

(3-2) Case where Only the Internal Temperature T(2) of the Second Tire 16 is Anomalous There will be described only the points which differ from the case where only the internal temperature T(1) of the first tire 15 is anomalous (the case of 3-1). When the value of n is 2, the CPU 51 makes a "No" determination in Step 515, and then proceeds to Step 545 so as to set 1 to the determination flag F(2). Subsequently, the CPU 51 makes a "Yes" determination in Step 840, and proceeds to Step 850 so as to store, as the front-wheel wheel speed ESPDf, the slip-value calculation wheel speed SPDH(1).

Accordingly, the slip value ESPD is calculated more accurately on the basis of the slip-value calculation wheel speeds SPDH(1), SPDH(3), and SPDH (4) of the first, third, and fourth wheels 11, 13, and 14, without use of the slip-value calculation wheel speed SPDH(2) of the second wheel 12 whose tire internal temperature is anomalous. As a result, the EBD control is executed at more proper timing in accordance with the slip value ESPD.

(3-3) Case where Both the Internal Temperature T(1) of the First Tire 15 and the Internal Temperature T(2) of the Second Tire 16 are Anomalous When the value of n is 1 or 2, the CPU 51 makes a "No" determination in Step 515, and then proceeds to Step 545 so as to set 1 to the determination flag F(1) and the determination flag F(2). Subsequently, the CPU 51 makes a "No" determination in Step 835 subsequent to Steps 800 and 805, and proceeds to Step 855 so as to set 1 to the determination flag G. After that, the CPU 51 proceeds to Step 895 via Step 830 so as to end the current execution of the present subroutine. Accordingly, when both the internal temperatures T(1) and T(2) are anomalous, the slip value ESPD is not calculated.

At the present point in time, the CPU 51 calls the subroutine of FIG. 9, starts the processing from Step 900, and proceeds to Step 905. Since the determination flag G has been set to 1, the CPU 51 makes a "No" determination in Step 905, and proceeds to Step 920 so as to set 0 to the determination flag H. Subsequently, the CPU 51 proceeds to Step 995 so as to end the current execution of the present subroutine. As a result, the EBD control is not performed.

(3-4) Case where Only the Internal Temperature T(3) of the Third Tire 17 is Anomalous When the value of n is 3, the CPU 51 set 1 to the determination flag F(3) in Step 545. Subsequently, the CPU 51 makes a "No" determination Step 815 subsequent to Steps 800 to 810, and then proceeds to Step 860 so as to determine whether the determination flag F(3) or the determination flag F(4) has been set to 0. Since the determination flag F(4) has been set to 0 before this point in time, the CPU 51 makes a "Yes" determination in Step 860, and proceeds to Step 865 so as to determine whether the value of the determination flag F(3) is 0. Since the determination flag F(3) has been set to 1 before this point in time, the CPU 51 makes a "No" determination in Step 865, and proceeds to Step 870 so as to store, as the rear-wheel wheel speed ESPDr, the slip-value calculation wheel speed SPDH(4). Subsequently, the CPU 51 proceeds to Step 825 so as to calculate the slip value ESPD. After that, the CPU 51 proceeds to Step 895 via Step 830 so as to end the current execution of the present subroutine.

Accordingly, the slip value ESPD is calculated more accurately on the basis of the slip-value calculation wheel speeds SPDH(1), SPDH(2), and SPDH(4) of the first, second, and fourth wheels 11, 12, and 14, without use of the slip-value calculation wheel speed SPDH(3) of the third wheel 13 whose tire internal temperature is anomalous.

(3-5) Case where Only the Internal Temperature T(4) of the Fourth Tire 18 is Anomalous There will be described only the points which differ from the case where only the internal temperature T(3) of the third tire 17 is anomalous (the case of 3-4). When the value of n is 4, the CPU 51 sets 1 to the determination flag F(4) in Step 545, makes a "Yes" determination in Step 865, and proceeds to Step 875 so as to store, as the rear-wheel wheel speed ESPDr, the slip-value calculation wheel speed SPDH(3).

Accordingly, the slip value ESPD is calculated more accurately on the basis of the slip-value calculation wheel speeds SPDH(1) to SPDH(3) of the first through third wheels 11 to 13, without use of the slip-value calculation wheel speed SPDH(4) of the fourth wheel 14 whose tire internal temperature is anomalous.

(3-6) Case where Both the Internal Temperature T(3) of the Third Tire 17 and the Internal Temperature T(4) of the Fourth Tire 18 are Anomalous The CPU 51 set 1 to the determination flag F(3) and the determination flag F(4) in Step 545, makes a "No" determination in Step 815 subsequent to Steps 800 and 810, and makes a "No" determination in Step 860 as well. Subsequently, the CPU 51 proceeds to Step 855 so as to set 1 to the determination flag G. After that, the CPU 51 proceeds to Step 895 via Step 830 so as to end the current execution of the present subroutine.

After that, when the CPU 51 proceeds to Step 905 subsequent to Step 900, the CPU 51 makes a "No" determination in Step 905, and proceeds to Step 920 so as to set 0 to the determination flag H. Subsequently, the CPU 51 proceeds to Step 995 so as to end the current execution of the present subroutine. As a result, the EBD control is not performed.

As described above, when at least one of the internal temperature of the first tire 15 and that of the second tire 16 falls in an normal range, and at least one of the internal temperature of the third tire 17 and that of the fourth tire 18 falls in an normal range, the CPU 51 calculates the slip value ESPD from the slip-value calculation wheel speeds SPDH (n) of tires whose internal temperatures are normal, excluding a wheel(s) whose tire internal temperature is anomalous, and performs the EBD control shown in FIGS. 9 and 10 as described above, in accordance with the calculated slip value ESPD. Further, when both the tire internal temperatures of the left and right front wheels are anomalous or when both the tire internal temperatures of the left and right rear wheels are anomalous, a reliable slip value ESPD cannot be calculated, and therefore, the EDB control is not performed.

(4) Case where the Wheel Speed Sensor of the n-th Wheel Becomes Anomalous when the Vehicle is Traveling First, the case where only the first wheel speed sensor 31 is anomalous will be described. In this case, the CPU 51 makes a "No" determination in Step 510 subsequent to Steps 500 and 505, and proceeds to Step 545 so as to set 1 to the determination flag F(1). Since the processing after that is identical with that in the case where the internal temperature of the first tire 15 is anomalous, its description will be omitted.

Notably, since the processing for the case where a different wheel speed sensor n becomes anomalous is identical with that in the case where the internal temperature T(n) of the n-th tire becomes anomalous, its description will be omitted.

The above-described braking force distribution apparatus 10 comprises:

front-wheel braking force application means (brake hydraulic pressure control section 20) for applying to a front wheel of a vehicle a braking force corresponding to a braking operation (depressed amount, depressing force of the brake pedal BP);

rear-wheel braking force application means (brake hydraulic pressure control section 20) for applying to a rear wheel of the vehicle a braking force corresponding to the braking operation and a control signal;

front-wheel wheel speed obtaining means for obtaining peripheral speed of a tire of the front wheel as front-wheel wheel speed ESPDf;

rear-wheel wheel speed obtaining means for obtaining peripheral speed of a tire of the rear wheel as rear-wheel wheel speed ESPDr;

slip value calculation means (Step 825), operable when the braking operation is performed, for calculating a slip value ESPD on the basis of the obtained front-wheel wheel speed and rear-wheel wheel speed, the slip value corresponding to the degree of slippage of the rear wheel with respect to the front wheel; and control signal generation means (Steps 915 and 925–945) for generating the control signal in such a manner that the ratio of the braking force applied to the rear wheel to the braking force applied to the front wheel decreases in accordance with the calculated slip value, wherein, the front-wheel wheel speed obtaining means includes:

front-wheel angular speed detection means (the first wheel speed sensor 31, the second wheel speed sensor 32, and the angular speed calculation routine) for detecting angular speed ($\omega 1$ and $\omega 2$) of the front wheel;

front-wheel tire pressure detection means (the first pressure sensor 35 and the second pressure sensor 36) for detecting internal pressure (P(1) and P(2)) of the tire of the front wheel; and front-wheel wheel speed calculation means (Steps 415, 520–530, 805, 810, 835–850) for calculating the wheel speed of the on the basis of wheel from the detected angular speed of the front wheel and the detected internal pressure of the tire of the front wheel, and the rear-wheel wheel speed obtaining means includes:

rear-wheel angular speed detection means (the third wheel speed sensor 33, the fourth wheel speed sensor 34, and the angular speed calculation routine) for detecting angular speed ($\omega 3$ and $\omega A$) of the rear wheel;

rear-wheel tire pressure detection means (the third pressure sensor 37 and the fourth pressure sensor 38) for detecting internal pressure (P(3) and P(4)) of the tire of the rear wheel; and rear-wheel wheel speed calculation means (Steps 415, 520–530, 815, 820, 860–875) for calculating the wheel speed of the rear wheel on the basis of the detected angular speed of the rear wheel and the detected internal pressure of the tire of the rear wheel.

By virtue of this configuration, the wheel speed (ESPDf) of the front wheel and the wheel speed (ESPDr) of the rear wheel are calculated, as more accurate values, from the slip-value calculation wheel speeds SPDH(n), which are calculated on the basis of the tire internal pressures P(n) of the respective wheels; i.e., in accordance with the dynamic load radiuses R(n) of the respective wheels. Accordingly, the slip value ESPD indicating the degree of slippage of the rear wheel with respect to the front wheel, which is calculated from these wheel speeds, becomes more accurate. As a result, the braking force distribution control is performed at more proper timing in accordance with the slip value ESPD, and locking of the rear wheels prior to that of the front wheels can be avoided more reliably.

The braking force distribution apparatus 10 further comprises:

reference pressure setting means (Steps 310 and 315) for setting, in response to an external operation signal (a signal from the operation switch 39), values corresponding to the tire internal pressure of the front wheel and the tire internal pressure of the rear wheel, respectively, as a reference tire pressure (PS(1) and PS(2)) of the front wheel and a reference tire pressure (PS(3) and PS(4)) of the rear wheel, wherein the front-wheel wheel speed calculation means calculates a value DP(n) indicative of a change in dynamic load radius of the tire of the front wheel on the basis of a deviation $\Delta$TP(n) of the detected tire internal pressure P(n) of the front wheel from the reference tire pressure PS(n) of the front wheel, and calculates the wheel speed ESPDf of the front wheel on the basis of the detected angular speed $\omega$n of the front wheel and the calculated value DP(n) indicative of the change in dynamic load radius of the tire of the front wheel;

the rear-wheel wheel speed calculation means calculates a value DP(n) indicative of a change in dynamic load radius of the tire of the rear wheel on the basis of a deviation $\Delta$TP(n) of the detected tire internal pressure P(n) of the rear wheel from the reference tire pressure PS(n) of the rear wheel, and calculates the wheel speed ESPDr of the rear wheel on the basis of the detected angular speed $\omega$n of the rear wheel and the calculated value DP(n) indicative of the change in dynamic load radius of the tire of the rear wheel; and the slip value calculation means calculates the slip value ESPD on the basis of the calculated wheel speed of the front wheel and the calculated wheel speed of the rear wheel.

Figure 6:
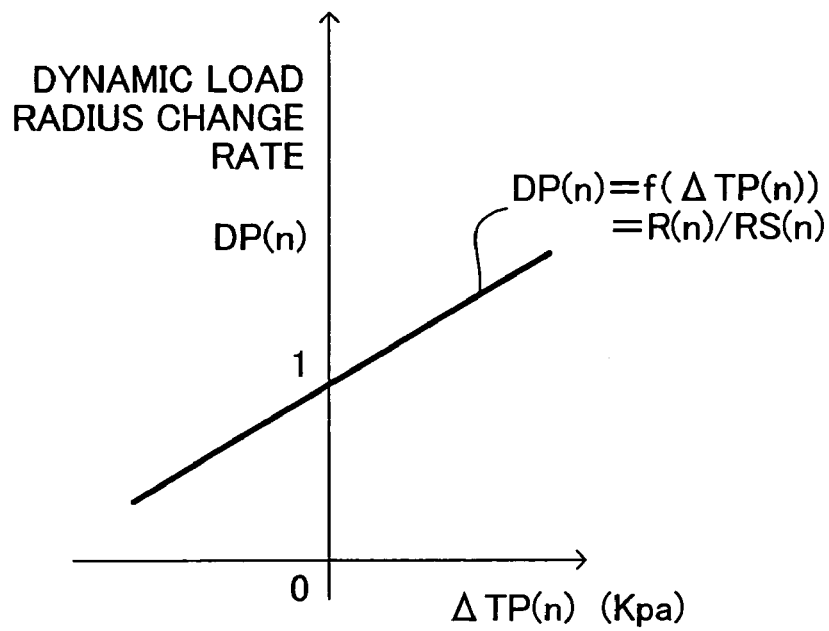
FIG. 6 is a correlation map showing the relation between tire inner pressure deviation and tire dynamic load radius change rate.
Figure 7:
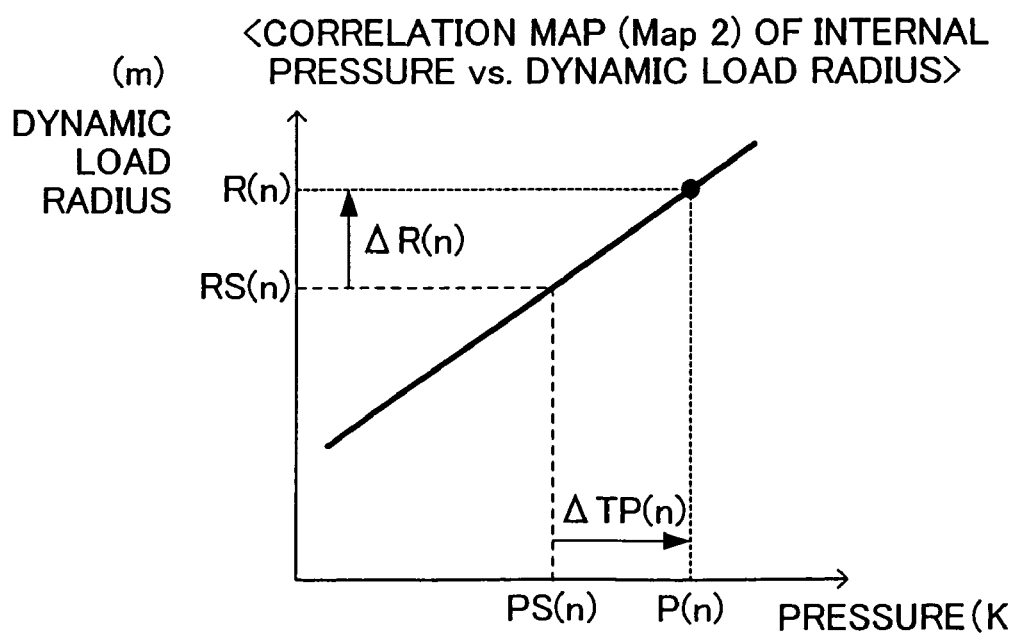
FIG. 7 is a correlation map showing the relation between tire inner pressure and tire dynamic load radius.

Meanwhile, the relation between the deviation $\Delta$TP(n) of the tire internal pressure P(n) from the reference pressure PS(n) and a change DP(n) in the dynamic load radius based on the deviation can be considered to be generally constant, as shown in FIGS. 6 and 7, irrespective of, for example, the type of the tire. In view of this, for each wheel, a value DP(n) indicative of a change in dynamic load radius is calculated on the basis of the deviation $\Delta$TP(n) of the tire internal pressure P(n) of the wheel from the reference tire pressure PS(n) set for the wheel, and the wheel speed (ESPDf, ESPDr) of the wheel is obtained from the slip-value calculation wheel speed SPDH(n), which is calculated on the basis of the value DP(n) indicative of the change in dynamic load radius and the angular speed $\omega$n of the wheel. In this case, the obtained wheel speed is close to the accurate peripheral speed of the tire. As a result, the slip value ESPD is calculated more accurately, so that the braking force distribution control is performed at more proper timing. Thus, locking of the rear wheels prior to that of the front wheels can be avoided more reliably.

The above-described braking force distribution apparatus 10 for a four-wheeled vehicle comprises:

front-wheel braking force application means (brake hydraulic pressure control section 20) for applying to left and right front wheels of the vehicle a braking force corresponding to a braking operation (operation of the brake pedal BP);

rear-wheel braking force application means (brake hydraulic pressure control section 20) for applying to left and right rear wheels of the vehicle a braking force corresponding to the braking operation and a control signal;

front-wheel wheel speed obtaining means for obtaining a front-wheel wheel speed ESPDf substantially representing the wheel speed of the front wheels;

rear-wheel wheel speed obtaining means for obtaining a rear-wheel wheel speed ESPDr substantially representing the wheel speed of the rear wheels;

slip value calculation means (Step 825), operable when the braking operation is performed, for calculating a slip value ESPD on the basis of the obtained front-wheel wheel speed and rear-wheel wheel speed, the slip value corresponding to the degree of slippage of the rear wheels with respect to the front wheels; and control signal generation means (Steps 915 and 925–945) for generating the control signal in such a manner that the ratio of the braking force applied to the rear wheels to the braking force applied to the front wheels decreases in accordance with the calculated slip value, wherein, the front-wheel wheel speed obtaining means includes:

front-wheel angular speed detection means (the first wheel speed sensor 31, the second wheel speed sensor 32, and the angular speed calculation routine) for detecting angular speed ω1 of the right front wheel and angular speed ω2 of the left front wheel;

front-wheel tire temperature detection means (the first pressure sensor 35 and the second pressure sensor 36) for detecting internal temperature T(1) of the tire of the right front wheel and internal temperature T(2) of the tire of the left front wheel;

front-wheel tire temperature condition determination means (Step 515) for determining whether each of the detected internal temperature of the tire of the left front wheel and the detected internal temperature of the tire of the right front wheel satisfies a predetermined temperature condition (T(n)≦the upper limit temperature); and front-wheel wheel speed calculation means for calculating (Step 810) the wheel speed ESPDf of the front wheels on the basis of the angular speeds of the left and right front wheels when both the detected internal temperatures of the tires of the left and right front wheels satisfy the temperature condition for the front wheels, and for calculating (Steps 845 and 850) the wheel speed ESPDf of the front wheels on the basis of the angular speed of one wheel which satisfies the temperature condition for the front wheels without consideration of the angular speed of the other wheel which fails to satisfy the temperature condition for the front wheels when only one of the detected internal temperatures of the tires of the left and right front wheels satisfies the temperature condition for the front wheels, and the rear-wheel wheel speed obtaining means includes:

rear-wheel angular speed detection means (the third wheel speed sensor 33, the fourth wheel speed sensor 34, and the angular speed calculation routine) for detecting angular speed ω3 of the left rear wheel and angular speed ω4 of the right rear wheel;

rear-wheel tire temperature detection means (the third pressure sensor 37 and the fourth pressure sensor 38) for detecting internal temperature T(3) of the tire of the left rear wheel and internal temperature T(4) of the tire of the right rear wheel;

rear-wheel tire temperature condition determination means (Step 515) for determining whether each of the detected internal temperature of the tire of the left rear wheel and the detected internal temperature of the tire of the right rear wheel satisfies a predetermined temperature condition for the rear wheels (T(n)≦the upper limit temperature); and rear-wheel wheel speed calculation means for calculating (Step 820) the wheel speed ESPDr of the rear wheels on the basis of the angular speeds of the left and right rear wheels when both the detected internal temperatures of the tires of the left and right rear wheels satisfy the temperature condition for the rear wheels, and for calculating (Steps 870 and 875) the wheel speed ESPDr of the rear wheels on the basis of the angular speed of one wheel which satisfies the temperature condition for the rear wheels without consideration of the angular speed of the other wheel which fails to satisfy the temperature condition for the rear wheels when only one of the detected internal temperatures of the tires of the left and right rear wheels satisfies the temperature condition for the rear wheel.

When the travel of the vehicle is continued in a state in which the tire air pressure P(n) has dropped, in some case, a large distortion is generated in a side wall portion, with the result that the tire bursts. This phenomenon often occurs because of an extreme increase in the temperature of the side wall portion where the large distortion is generated. In the case where the tire internal temperature is anomalous (the internal temperature T(n) of the tire n>the upper limit temperature) as described above, the present apparatus excludes the information regarding such a tire in an instable condition from the information from which the slip value ESPD is calculated, and the slip value ESPD is calculated on the basis of the slip-value calculation wheel speed SPDH(n) of the remaining tires. Accordingly, the slip value ESPD can be obtained accurately, whereby the EBD control is executed at more proper timing. Thus, lock of the rear wheels prior to that of the front wheels can be avoided more reliably.

Notably, the CPU 51 determines, on the basis of speed signals output from the first through fourth wheel speed sensors 31 to 34, whether the first through fourth wheel speed sensors 31 to 34 are in an anomalous condition. For example, when the wire which connects a certain wheel speed sensor and the electronic controller 50 is broken or short-circuited, or when a detection output of a certain wheel speed sensor contains noise of an unacceptable level, such wheel speed sensor outputs a speed signal containing anomalous pulses. Therefore, the CPU 51 determines, on the basis of the state of the pulses, that the wheel speed sensor is anomalous.

Second Embodiment

Next, a braking force distribution apparatus 10 according to a second embodiment of the present invention will be described. In the braking force distribution apparatus 10 according to the first embodiment, when the state of the wheel speed sensor n or the internal temperature T(n) of the tire n is anomalous, the information regarding the corresponding wheel is removed from the information from which the slip value ESPD is calculated, and the slip-value calculation wheel speed SPDH(n) is calculated on the basis of the wheel speeds SPD (n) and change rates DP(n) of the remaining wheels. The braking force distribution apparatus 10 according to the second embodiment differs from the braking force distribution apparatus 10 according to the first embodiment in that different methods are employed for the calculation of the slip-value calculation wheel speed SPDH (n), depending on whether or not the tire internal pressure P(n) satisfies the predetermined pressure condition. Operation of the braking force distribution apparatus 10 according to the second embodiment (mainly, portions which differ from those of the first embodiment) will now be described for different cases. Notably, steps which perform the same processing as that of the steps already described are denoted by the same reference numerals, and their detailed descriptions will be omitted.

Figure 11:
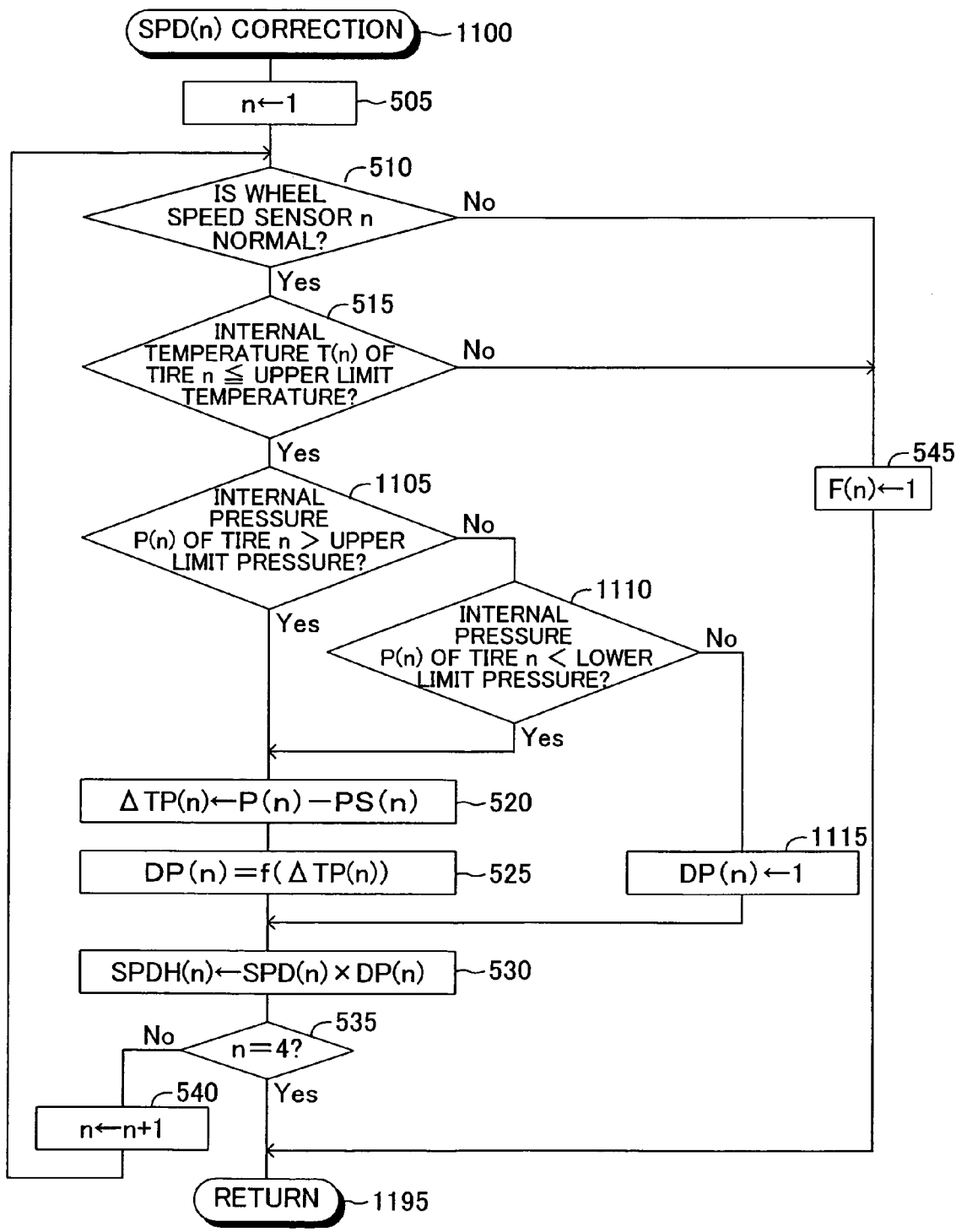
FIG. 11 is a flowchart showing a program according to a second embodiment which is executed in order to correct the wheel speeds.

(4-1) Case where the Internal Pressure P(n) of the Tire n is not Less than a Lower Limit Pressure and not Greater than an Upper Limit Pressure When the predetermined timing has come, the CPU 51 starts the subroutine of FIG. 11 from Step 1100, in place of the subroutine of FIG. 5. The CPU 51 then proceeds to Step 1105 subsequent to Steps 505 to 515 so as to determine whether the internal pressure P(n) of the tire n is greater than the upper limit pressure. Under the assumption, the internal pressure P(n) of the tire n is equal to or less than the upper limit pressure. Therefore, the CPU 51 makes a "No" determination in Step 1105, and then proceeds to Step 1110 so as to determine whether the internal pressure P(n) of the tire n is less than the lower limit pressure. Under the assumption, the internal pressure P(n) of the tire n is not less than the lower limit pressure. Therefore, the CPU 51 makes a "No" determination in Step 1110, and then proceeds to Step 1115 so as to set 1 to the dynamic load radius change rate DP(n). Subsequently, the CPU 51 proceeds to Step 530 so as to obtain the slip-value calculation wheel speed SPDH(n) by multiplying the wheel speed SPD(n) by the dynamic load radius change rate DP(n) (stores the wheel speed SPD(n) as the slip-value calculation wheel speed SPDH(n) without any correction), and then returns to Step 510 via Steps 535 and 540.

(4-2) Case where the Internal Pressure P(n) of the Tire n Becomes Greater than the Upper Limit Pressure The CPU 51 makes a "Yes" determination in Step 1105 subsequent to Steps 505 to 515, and proceeds to Step 520, and then to Step 525 so as to obtain the dynamic load radius change rate DP(n). Subsequently, the CPU 51 proceeds to Step 530 so as to obtain the slip-value calculation wheel speed SPDH(n) by multiplying the wheel speed SPD(n) by the dynamic load radius change rate DP(n) (by correcting the wheel speed SPD(n) with the dynamic load radius change rate DP(n)). After that, the CPU 51 returns to Step 510 via Steps 535 and 540.

(4-3) Case where the Internal Pressure P(n) of the Tire n Becomes Less than the Lower Limit Pressure The CPU 51 makes a "Yes" determination in Step 1110 subsequent to Steps 505 to 515 and 1105. As in the case where the internal pressure P(n) of the tire n is greater than the upper limit pressure, the CPU 51 performs the processing of Step 520 to 530 to thereby obtain the slip-value calculation wheel speed SPDH(n), and then returns to Step 510 via Steps 535 and 540. After that, the CPU 51 repeats the processing from Step 510, and when the CPU 51 makes a "Yes" determination in Step 535, the CPU 51 proceeds from Step 535 to Step 1195 so as to end the current execution of the present subroutine.

After that, the CPU 51 calculates the slip value ESPD on the basis of the slip-value calculation wheel speed SPDH(n) obtained by one of different methods (the method realized by Steps 520 to 530 and the method realized by Steps 1115 and 530) in accordance with the tire internal pressure (see FIG. 8), and executes the EBD control on the basis of the slip value ESPD (see FIG. 9).

In the above-described braking force distribution apparatus 10, the front-wheel wheel speed calculation means includes front-wheel tire pressure condition determination means (Steps 1105 and 1110) for determining whether the detected tire internal pressure of the front wheel satisfies the prescribed pressure condition for the front wheel (the lower limit pressure$\leq$P(n)$\leq$the upper limit pressure), when the detected tire internal pressure P(n) of the front wheel does not satisfy the pressure condition for the front wheels, the front-wheel wheel speed calculation means calculates the wheel speed ESPDf of the front wheel on the basis of the detected angular speed ωn of the front wheel and the detected tire internal pressure P(n) of the front wheel (Steps 520–530, 805, 810, and 835–850), and when the detected tire internal pressure of the front wheel satisfies the pressure condition for the front wheels, the front-wheel wheel speed calculation means calculates the wheel speed of the front wheel on the basis of the detected angular speed of the front wheel without consideration of the detected tire internal pressure of the front wheel (Steps 1115, 530, 805, 810, and 835–850); and the rear-wheel wheel speed calculation means includes rear-wheel tire pressure condition determination means for determining whether the detected tire internal pressure of the rear wheel satisfies a prescribed pressure condition for the rear wheel (the lower limit pressure$\leq$P(n)$\leq$the upper limit pressure), when the detected tire internal pressure P(n) of the rear wheel does not satisfy the pressure condition for the rear wheel, the rear-wheel wheel speed calculation means calculates the wheel speed ESPDr of the rear wheel on the basis of the detected angular speed ωn of the rear wheel and the detected tire internal pressure P(n) of the rear wheel (Steps 520–530, 815, 820, and 860–875), and when the detected tire internal pressure of the rear wheel satisfies the pressure condition for the rear wheel, the rear-wheel wheel speed calculation means calculates the wheel speed of the rear wheel on the basis of the detected angular speed of the rear wheel without consideration of the detected tire internal pressure of the rear wheel (Steps 1115, 530, 815, 820, and 860–875).

The dynamic load radius of a tire greatly changes in accordance with the internal pressure of the tire. Therefore, the error between the wheel speed SPD(n) and the true wheel speed increases, as the deviation of the tire internal pressure P(n) from the tire internal pressure in the ordinary state increases. In the braking force distribution apparatus 10 of the present embodiment in which the above fact is taken into consideration, when one of the first tire 15 to the fourth tire 18 does not satisfy the predetermined pressure condition, the wheel speed SPD(n) of a wheel to which the tire n is attached (a wheel whose wheel speed SPD(n) involves a large error) is corrected with the dynamic load radius change rate DP(n), whereby the slip-value calculation wheel speed SPDH(n) is obtained. When the tire n satisfies the predetermined pressure condition, the wheel speed SPD(n) of a wheel to which the tire n is attached (a wheel whose wheel speed SPD(n) involves a small error) is stored as the slip-value calculation wheel speed SPDH(n) without any correction.

Then, in the present embodiment, the front-wheel wheel speed ESPDf and the rear-wheel wheel speed ESPDr are calculated more accurately on the basis of the slip-value calculation wheel speed SPDH(n) obtained by the above-described two ways. Accordingly, since the slip value ESPD is calculated more accurately, the EBD control can be started at more proper timing. Notably, the above-mentioned predetermined pressure condition (the pressure condition for the front wheels and the pressure condition for the rear wheels) can be said that "the detected tire internal pressure falls within a pressure range in which the wheel speed is not required to be corrected on the basis of the tire internal pressure, because the difference between the detected tire internal pressure and the previously assumed tire internal pressure is small, and therefore, the difference between the actual dynamic load radius and the previously assumed dynamic load radius is small."

Third Embodiment

Next, a braking force distribution apparatus 10 according to a third embodiment of the present invention will be described. In the braking force distribution apparatus 10 according to the second embodiment, when the internal pressure P(n) of the tire n becomes greater than the upper limit pressure or lower than the lower limit pressure, the slip-value calculation wheel speed SPDH(n) is obtained through correction of the wheel speed SPD(n) with the dynamic load radius change rate DP(n). The third embodiment differs from the second embodiment in that when the internal pressure P(n) of the tire n is anomalously high or anomalously low, the wheel speed SPD(n) of the wheel n to which the tire n is attached is removed from the values used for calculation of the slip value ESPD. Operation of the braking force distribution apparatus 10 according to the third embodiment (mainly, portions which differ from those of the first embodiment) will now be described for different cases.

Figure 12:
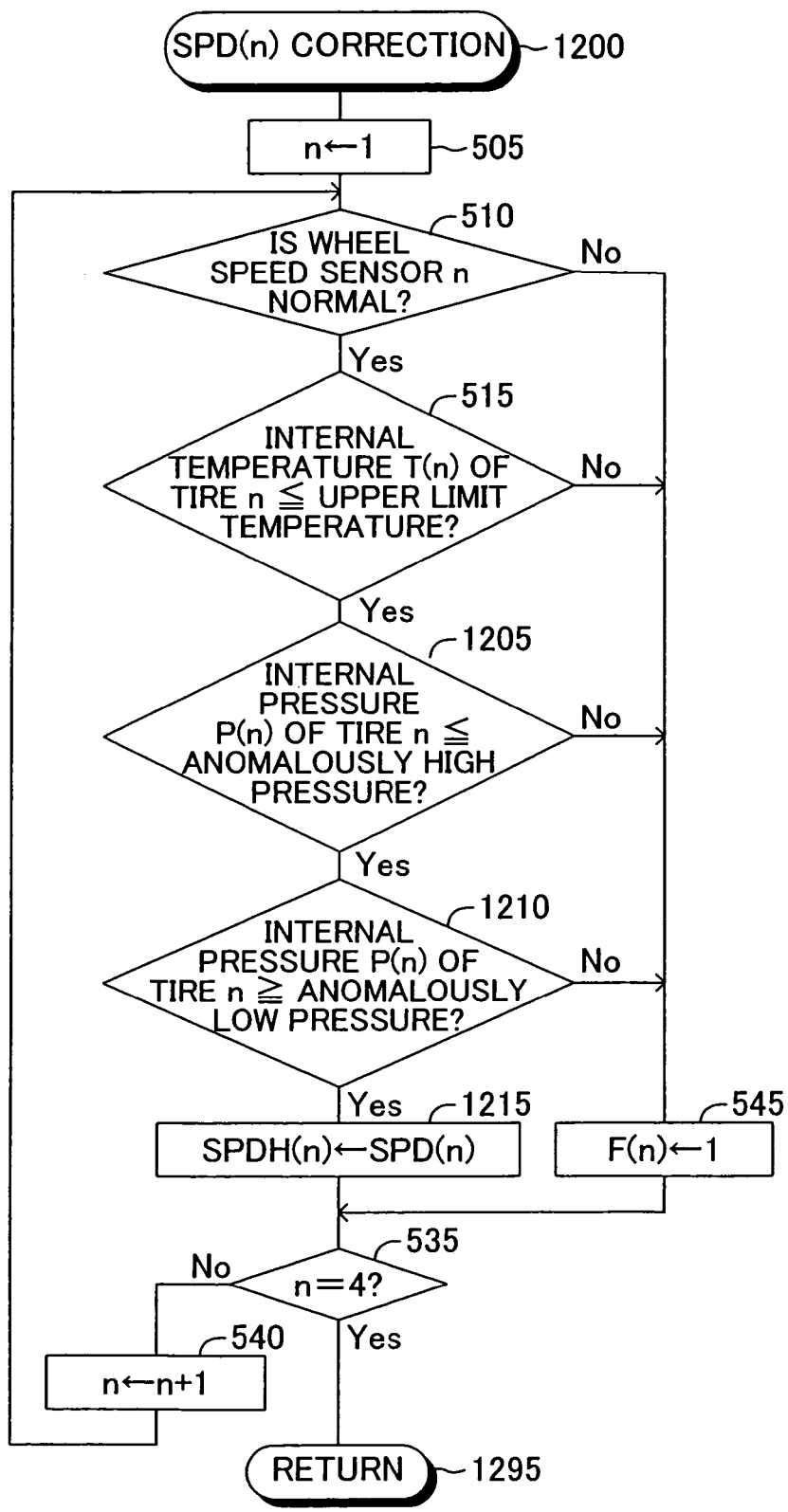
FIG. 12 is a flowchart showing a program according to a third embodiment which is executed in order to correct the wheel speeds.

(5-1) Case where the Internal Pressure P(n) of the Tire n is not Less than an Anomalously Low Pressure and not Greater than an Anomalously High Pressure When the predetermined timing has come, the CPU 51 starts the subroutine of FIG. 12 from Step 1200, in place of the subroutine of FIG. 11. The CPU 51 then proceeds to Step 1205 subsequent to Steps 505 to 515 so as to determine whether the internal pressure P(n) of the tire n is equal to or less than the anomalously high pressure. Under the assumption, the internal pressure P(n) of the tire n is equal to or less than the anomalously high pressure. Therefore, the CPU 51 makes a "Yes" determination in Step 1205, and then proceeds to Step 1210 so as to determine whether the internal pressure P(n) of the tire n is equal to or higher than the anomalously low pressure. Under the assumption, the internal pressure P(n) of the tire n is equal to or higher than the anomalously low pressure. Therefore, the CPU 51 makes a "Yes" determination in Step 1210, and then proceeds to Step 1215 so as to store the value of the wheel speed SPD(n) as the slip-value calculation wheel speed SPDH(n). After that, the CPU 51 returns to Step 510 via Steps 535 and 540.

(5-2) Case where the Internal Pressure P(n) of the Tire n Becomes Greater than the Anomalously High Pressure The CPU 51 makes a "No" determination in Step 1205 subsequent to Steps 505 to 515, and proceeds to Step 545 so as to set 1 to the determination flag F(n). The CPU 51 then returns to Step 510 via Steps 535 and 540. After that, the CPU 51 repeats the processing from Step 510, and when the CPU 51 makes a "Yes" determination in Step 535, the CPU 51 proceeds from Step 535 to Step 1295 so as to end the current execution of the present subroutine.

(5-3) Case where the Internal Pressure P(n) of the Tire n Becomes Lower than the Anomalously Low Pressure The CPU 51 makes a "No" determination in Step 1210 subsequent to Steps 505 to 515 and 1205, and proceeds to Step 545 so as to set 1 to the determination flag F(n). The CPU 51 then returns to Step 510 via Steps 535 and 540. After that, the CPU 51 repeats the processing from Step 510, and when the CPU 51 makes a "Yes" determination in Step 535, the CPU 51 proceeds from Step 535 to Step 1295 so as to end the current execution of the present subroutine.

At this point in time, when the CPU 51 executes the routine of FIG. 8, the slip-value calculation wheel speed SPDH(n) of a wheel corresponding to a tire which fails to satisfy the predetermined condition (the state of the wheel speed sensor is anomalous, the internal temperature of the tire is anomalous, the internal pressure of the tire is anomalous) is removed from the values used for calculation of the front-wheel wheel speed ESPDf and the rear-wheel wheel speed ESPDr; and the front-wheel wheel speed ESPDf and the rear-wheel wheel speed ESPDr are calculated on the basis of the slip-value calculation wheel speeds SPDH(n) of the wheels of the remaining tires (Steps 845, 850, 870, and 875). Subsequently, the slip value ESPD is calculated from the thus-obtained front-wheel wheel speed ESPDf and the rear-wheel wheel speed ESPDr (Step 825), and the EBD control shown in FIG. 9 is performed on the basis of the slip value ESPD.

The above-described braking force distribution apparatus 10 for a four-wheeled vehicle comprises:

front-wheel braking force application means (brake hydraulic pressure control section 20) for applying to left and right front wheels of the vehicle a braking force corresponding to a braking operation (operation of the brake pedal BP);

rear-wheel braking force application means (brake hydraulic pressure control section 20) for applying to left and right rear wheels of the vehicle a braking force corresponding to the braking operation and a control signal;

front-wheel wheel speed obtaining means for obtaining a front-wheel wheel speed ESPDf substantially representing the wheel speed of the front wheels;

rear-wheel wheel speed obtaining means for obtaining a rear-wheel wheel speed ESPDr substantially representing the wheel speed of the rear wheels;

slip value calculation means (Step 825), operable when the braking operation is performed, for calculating a slip value ESPD on the basis of the obtained front-wheel wheel speed and rear-wheel wheel speed, the slip value corresponding to the degree of slippage of the rear wheels with respect to the front wheels; and control signal generation means (Steps 915, 925, and 930–945) for generating the control signal in such a manner that the ratio of the braking force applied to the rear wheels to the braking force applied to the front wheels decreases in accordance with the calculated slip value, wherein, the front-wheel wheel speed obtaining means includes:

front-wheel angular speed detection means (the first wheel speed sensor 31, the second wheel speed sensor 32, and the angular speed calculation routine) for detecting angular speed $\omega 1$ of the right front wheel and angular speed $\omega 2$ of the left front wheel;

front-wheel tire pressure detection means (the first pressure sensor 35 and the second pressure sensor 36) for detecting internal pressure P(1) of the tire of the right front wheel and internal pressure P(2) of the tire of the left front wheel;

front-wheel tire pressure condition determination means (Steps 1205 and 1210) for determining whether each of the detected internal pressure of the tire of the left front wheel and the detected internal pressure of the tire of the right front wheel satisfies a predetermined pressure condition (the anomalously low pressure≦P(n)≦the anomalously high pressure); and front-wheel wheel speed calculation means for calculating (Steps 1215, 805, and 810) the wheel speed of the front wheels on the basis of the angular speeds of the left and right front wheels when both the detected internal pressures of the tires of the left and right front wheels satisfy the pressure condition for the front wheels, and for calculating (Steps 545, 1215, and 835–850) the wheel speed of the front wheels on the basis of the angular speed of one wheel which satisfies the pressure condition for the front wheels, without consideration of the angular speed of the other wheel which fails to satisfy the pressure condition for the front wheels, when only one of the detected internal pressures of the tires of the left and right front wheels satisfies the pressure condition for the front wheels, and the rear-wheel wheel speed obtaining means includes:

rear-wheel angular speed detection means (the third wheel speed sensor 33, the fourth wheel speed sensor 34, and the angular speed calculation routine) for detecting angular speed $\omega 3$ of the left rear wheel and angular speed $\omega 4$ of the right rear wheel;

rear-wheel tire pressure detection means (the third pressure sensor 37 and the fourth pressure sensor 38) for detecting internal pressure P(3) of the tire of the left rear wheel and internal pressure P(4) of the tire of the right rear wheel;

rear-wheel tire pressure condition determination means (Steps 1205 and 1210) for determining whether each of the detected internal pressure of the tire of the left rear wheel and the detected internal pressure of the tire of the right rear wheel satisfies a predetermined pressure condition for the rear wheels (the anomalously low pressure$\leq$P(n)$\leq$the anomalously high pressure); and rear-wheel wheel speed calculation means for calculating (Steps 1215, 815, and 820) the wheel speed of the rear wheels on the basis of the angular speeds of the left and right rear wheels when both the detected internal pressures of the tires of the left and right rear wheels satisfy the pressure condition for the rear wheels, and for calculating (Steps 545, 1215, and 860–875) the wheel speed of the rear wheels on the basis of the angular speed of one wheel which satisfies the pressure condition for the rear wheels, without consideration of the angular speed of the other wheel which fails to satisfy the pressure condition for the rear wheels, when only one of the detected internal pressures of the tires of the left and right rear wheels satisfies the pressure condition for the rear wheel.

In consideration of the case where the internal pressure of a tire has greatly deviated from its ordinary internal pressure, and thus, the error between the wheel speed SPD(n) of a wheel to which the tire is attached and the true wheel speed has become considerably large, the braking force distribution apparatus 10 of the present embodiment removes, from the values used for calculation of the front-wheel wheel speed ESPDf and the rear-wheel wheel speed ESPDr, the slip-value calculation wheel speed SPDH(n) of a tire (of the first through fourth tires 15 to 18) which does not satisfy the predetermined pressure condition (the anomalously low pressure$\leq$P(n)$\leq$the anomalously high pressure). Accordingly, the front-wheel wheel speed ESPDf and the rear-wheel wheel speed ESPDr can be calculated more accurately on the basis of the slip-value calculation wheel speed SPDH(n) of the remaining tires. As a result, the slip value ESPD can be calculated more accurately, and thus, the EBD control is started at more proper timing.

It should be noted that the predetermined upper limit temperature (the temperature condition for the front wheels and the temperature condition for the rear wheels) in all of the above-described embodiments is determined as follows. When the CPU 51 obtains the wheel speed SPD(n) of a wheel by use of the angular speed $\omega$n of the wheel and the dynamic load radius R(n) of the tire thereof, the error of the wheel speed SPD(n) increases with the deviation of the tire internal temperature from the ordinary tire internal temperature, because the dynamic load radius of the tire greatly changes depending on the tire internal temperature. When the error of the wheel speed SPD(n) is excessively large, the wheel speed SPD(n) of the wheel is not preferred to be used in calculation of the slip value ESPD. The predetermined upper limit temperature refers to a tire internal temperature at or above which the wheel speed SPD(n) of the wheel involves an excessive error, and therefore it is not preferred to be used.

The predetermined upper limit pressure and lower limit pressure (the pressure condition for the front wheels and the pressure condition for the rear wheels) in the above-described second embodiment are determined as follows. When the CPU 51 obtains the wheel speed SPD(n) of a wheel by use of the angular speed $\omega$n of the wheel and the dynamic load radius R(n) of the tire thereof and calculates the slip value ESPD on the basis of the wheel speed SPD(n), the calculated slip value ESPD involves a large error, because the dynamic load radius of the tire changes depending on the tire internal pressure. When the error of the slip value ESPD is excessively large, the wheel speed SPD(n) of the wheel corresponding to the tire is preferred to be corrected so as to reduce the error. The upper and lower limit pressures define a range of tire internal pressure, outside of which the wheel speed SPD(n) of the wheel is preferred to be corrected.

The predetermined anomalously high pressure and anomalously low pressure (the pressure condition for the front wheels and the pressure condition for the rear wheels) in the above-described third embodiment are determined as follows. When the CPU 51 obtains the wheel speed SPD(n) of a wheel by use of the angular speed $\omega$n of the wheel and the dynamic load radius R(n) of the tire thereof, the error of the wheel speed SPD(n) increases with the deviation of the tire internal pressure from the ordinary tire internal pressure, because the dynamic load radius of the tire greatly changes depending on the tire internal pressure. When the error of the wheel speed SPD(n) is excessively large, the wheel speed SPD(n) of the wheel is not preferred to be used in calculation of the slip value ESPD. The predetermined anomalously high pressure and anomalously low pressure define a range of tire internal pressure, outside of which the wheel speed SPD(n) of the wheel involves an excessive error, and therefore it is not preferred to be used.

In the above-described third embodiment, the CPU 51 may calculates the slip-value calculation wheel speed SPDH(n) through performance of Steps 520 to 530 instated of Step 1215 of FIG. 12. In this case, the error of the wheel speed SPD(n) produced stemming from a change in the tire dynamic load radium, which change is caused by a change in the tire internal pressure, is corrected by the dynamic load radius change rate DP(n). Therefore, the slip value ESPD can be calculated from the slip-value calculation wheel speed SPDH(n), which is close to the true wheel speed.

In all the embodiments described above, in order to perform the EBD control, the CPU 51 of the braking force distribution apparatus 10 requires not only the tire internal pressure P(n), but also the tire reference pressure PS(n), which is the pressure of the tire n adjusted to a standard pressure and which is set in response to a command from a vehicle occupant or a worker (service person) at a production plant or a service shop. This operation is performed in consideration of the fact that the dynamic load radius of the tire cannot be determined univocally from the tire internal pressure P(n) only.

More specifically, tires of various types can be attached to vehicles. As described above, the dynamic load radius changes in accordance with the type of selected tires, even if the tire internal pressure is the same. That is, since the tire dynamic load radius R(n) changes in accordance with the tire type as well, the tire dynamic load radius cannot be univocally determined from the tire internal pressure P(n) only. Meanwhile, since the signal obtained from the corresponding wheel speed sensor represents the angular speed $\omega$ of the wheel, conversion of the angular speed to the wheel speed requires the dynamic load radius RS.

In view of the above, in a design stage, the dynamic load radius RS of tires which will be attached to a vehicle is assumed. Hereinafter, this assumed dynamic load radius RS will be referred to as a "designed dynamic load radius RSstd." That is, the designed dynamic load radius RSstd is determined under the assumption that the vehicle will travels with such a dynamic load radius. Subsequently, the designed dynamic load radius RSstd is previously incorporated in a program which the CPU 51 executes so as to obtain the wheel speed SPD(n) (see Step 415). Although the tire internal pressure corresponding to the designed dynamic load radius RSstd is not univocally determined, the tire internal pressure can be considered to fall within a pressure range having a certain width.

The present inventors found that when the internal pressure of each tire is adjusted to the reference pressure PS(n) within the above-mentioned pressure range at a production plant for the vehicle, a service shop, or a like place, the change amount DP(n) of the dynamic load radius corresponding to the deviation ΔTP(n) of the internal pressure P(n) of the actual tire from the reference pressure PS(n) can be univocally determined irrespective of the type of the tire or the like. Meanwhile, a worker at, for example, a production plant or a service shop adjusts the internal pressure of each actual tire to a previously designated tire internal pressure. Although the actually adjusted internal pressure may vary slightly, it is correct to assume assumed that the adjusted internal pressure falls within the above-mentioned pressure range.

In view of the above, in response to an operation signal from the operation switch 39, which is operated by a worker after adjustment of the internal pressure, the present braking force distribution apparatus 10 sets the reference pressure PS(n). After that, the apparatus obtains the deviation ΔTP(n) of the internal pressure P(n) of the actual tire from the reference pressure PS(n), and obtains the change amount DP(n) of the dynamic load radius corresponding to the deviation ΔTP(n).

Specifically, during a period in which the vehicle travels, the CPU 51 fetches the tire internal pressure P(n) at predetermined internals (Step 430), obtains the deviation ΔTP(n) of the tire internal pressure P(n) from the reference pressure PS(n) (Step 520), and obtains the dynamic load radius change rate DP(n) corresponding to the deviation ΔTP(n) (step 525).

The CPU 51 multiplies the wheel speed SPD(n) by the change rate DP(n) (=R(n)/RS(n)) to thereby obtain the slip-value calculation wheel speed SPDH(n) (Step 530). As described above, the wheel speed SPD(n) can be obtained by multiplying the wheel angular speed ωn by the designed dynamic load radius RSstd. Accordingly, the processing of Step 530 can be said to be the processing for obtaining the slip-value calculation wheel speed SPDH(n) in accordance with the following Equation (1).

$$\begin{aligned} SPDH(n) &= SPD(n) \times DP(n) \\ &= SPD(n) \times \{R(n)/RS(n)\} \\ &= (\omega n \times RSstd) \times \{R(n)/RS(n)\} \\ &= \omega n \times \{RSstd \times R(n)/RS(n)\} \\ &= \omega n \times Rst(n) \end{aligned} \quad (1)$$

In Equation (1), Rst(n) represents the dynamic load radius corrected on the basis of the internal pressure P(n) of the actual tire, and is a value extremely close to the dynamic load radius of the actual tire corresponding to the internal pressure P(n) of the actual tire.

Further, the CPU 51 may obtain the slip-value calculation wheel speed SPDH(n) by use of the deviation ΔRn (=R(n)−RS(n)) of the dynamic load radius R(n) from the dynamic load radius RS(n) instead of the above-described change rate DP(n). Specifically, the above-described Equation (1) can be approximated to the following Equation (2) as follows.

$$\begin{aligned} SPDH(n) &= SPD(n) \times DP(n) \\ &= SPD(n) \times R(n)/RS(n) \\ &= SPD(n) \times (RS(n) + \Delta Rn)/RS(n) \\ &= (\omega n \times RSstd) \times (RS(n) + \Delta Rn)/RS(n) \\ &= (\omega n \times RSstd) \times \{1 + \Delta Rn/RS(n)\} \\ &= \omega n \times RSstd + \omega n \times RSstd \times \Delta Rn/RS(n) \\ &\cong \omega n(RSstd + \Delta Rn) \end{aligned} \quad (2)$$

(employed approximation $RSstd/RS(n) \cong 1$)

Accordingly, the CPU 51 may employ a method in which by use of the above-described Equation (2), the dynamic load radius change amount ΔRn is added to the designed dynamic load radius RSstd determined at the time of design so as to obtain a value considerably close to the actual dynamic load radius, and the resultant value (=RSstd+ΔRn) is multiplied by the angular speed ωn of the wheel n, whereby the slip-value calculation wheel speed SPDH(n) is obtained. In this case, as in the case of the dynamic load radius change rate DP(n), the deviation ΔRn can be said to be an example of a value corresponding to the change amount of the tire dynamic load radius corresponding to the above-mentioned deviation ΔTP(n).

As described above, in Steps 520 to 530, the CPU 51 performs the processing for obtaining a value considerably close to the actual dynamic load radius on the basis of the dynamic load radius RSstd determined at the time of design and the change amount of the dynamic load radius. However, in the case where parameters of each tire other than the internal pressure P(n) of the tire, e.g., the type of the tire, which affect the dynamic load radius of the tire are specified, the dynamic load radius R(n) corresponding to the internal pressure P(n) of the actual tire can be univocally determined by a function R(n)=g(P(n)), the CPU 51 need not execute the processing of the above-described Steps 520 to 530, and can calculate the slip-value calculation wheel speed SPDH(n) by executing a program in which the following Equation (3) is incorporated.

$$SPDH(n) = \omega n \times g(P(n)) = \omega n \times R(n) \quad (3)$$

The present invention is not limited to the above-described embodiments, and various modifications thereof may be employed within the scope of the invention. For example, the operation switch 39 may include numeral input means for allowing numeral input and means for specifying the tire number or position. In this case, when a worker adjusts the internal pressure of a tire, the worker can enter the adjusted internal pressure by means of the numeral input means. Alternatively, the operation switch 39 may include tire type input means for allowing entry of the type of the tire. In this case, the correlation map (Map 2) of FIG. 7 is switched in accordance with the tire type entered by means of the tire type input means.

Moreover, the front-wheel braking force application means and the rear-wheel braking force application means may be realized by a motor-driven brake actuator which generates braking force by means of electrical energy, in place of the brake hydraulic pressure control section 20 which applies braking force to the wheels by means of brake hydraulic pressure. The motor-driven brake actuator presses brake pads against a brake disk by means of torque generated by an electric motor to thereby generate a braking force, or retreats the brake pads from the brake disk to thereby reduce the braking force.

What is claimed is:

1. A braking force distribution apparatus for a vehicle, comprising:
   front-wheel braking force application means for applying to a front wheel of the vehicle a braking force corresponding to a braking operation;
   rear-wheel braking force application means for applying to a rear wheel of the vehicle a braking force corresponding to the braking operation and a control signal;
   front-wheel wheel speed obtaining means for obtaining a wheel speed of the front wheel;
   rear-wheel wheel speed obtaining means for obtaining a wheel speed of the rear wheel;
   slip value calculation means, operable when the braking operation is performed, for calculating a slip value on the basis of the obtained wheel speed of the front wheel and wheel speed of the rear wheel, the slip value corresponding to the degree of slippage of the rear wheel with respect to the front wheel; and
   control signal generation means for generating the control signal in such a manner that the ratio of the braking force applied to the rear wheel to the braking force applied to the front wheel decreases in accordance with the calculated slip value, wherein,
   the front-wheel wheel speed obtaining means includes:
   front-wheel angular speed detection means for detecting angular speed of the front wheel;
   front-wheel tire pressure detection means for detecting internal pressure of the tire of the front wheel; and
   front-wheel wheel speed calculation means for calculating the wheel speed of the front wheel on the basis of the detected angular speed of the front wheel and the detected internal pressure of the tire of the front wheel, and
   the rear-wheel wheel speed obtaining means includes:
   rear-wheel angular speed detection means for detecting angular speed of the rear wheel;
   rear-wheel tire pressure detection means for detecting internal pressure of the tire of the rear wheel; and
   rear-wheel wheel speed calculation means for calculating the wheel speed of the rear wheel on the basis of the detected angular speed of the rear wheel and the detected internal pressure of the tire of the rear wheel.

2. A braking force distribution apparatus according to claim 1, further comprising:
   reference pressure setting means for setting, in response to an external operation signal, values corresponding to the tire internal pressure of the front wheel and the tire internal pressure of the rear wheel, respectively, as a reference tire pressure of the front wheel and a reference tire pressure of the rear wheel, wherein
   the front-wheel wheel speed calculation means calculates a value indicative of a change in dynamic load radius of the tire of the front wheel on the basis of a deviation of the detected tire internal pressure of the front wheel from the reference tire pressure of the front wheel, and calculates the wheel speed of the front wheel on the basis of the detected angular speed of the front wheel and the calculated value indicative of the change in dynamic load radius of the tire of the front wheel;
   the rear-wheel wheel speed calculation means calculates a value indicative of a change in dynamic load radius of the tire of the rear wheel on the basis of a deviation of the detected tire internal pressure of the rear wheel from the reference tire pressure of the rear wheel, and calculates the wheel speed of the rear wheel on the basis of the detected angular speed of the rear wheel and the calculated value indicative of the change in dynamic load radius of the tire of the rear wheel; and
   the slip value calculation means calculates the slip value on the basis of the calculated wheel speed of the front wheel and the calculated wheel speed of the rear wheel.

3. A braking force distribution apparatus according to claim 1, wherein
   the front-wheel wheel speed calculation means includes front-wheel tire pressure condition determination means for determining whether the detected tire internal pressure of the front wheel satisfies a prescribed pressure condition for the front wheel, calculates the wheel speed of the front wheel on the basis of the detected angular speed of the front wheel and the detected tire internal pressure of the front wheel when the detected tire internal pressure of the front wheel does not satisfy the pressure condition for the front wheel, and calculates the wheel speed of the front wheel on the basis of the detected angular speed of the front wheel without consideration of the detected tire internal pressure of the front wheel when the detected tire internal pressure of the front wheel satisfies the pressure condition for the front wheel; and
   the rear-wheel wheel speed calculation means includes rear-wheel tire pressure condition determination means for determining whether the detected tire internal pressure of the rear wheel satisfies a prescribed pressure condition for the rear wheel, calculates the wheel speed of the rear wheel on the basis of the detected angular speed of the rear wheel and the detected tire internal pressure of the rear wheel when the detected tire internal pressure of the rear wheel does not satisfy the pressure condition for the rear wheel, and calculates the wheel speed of the rear wheel on the basis of the detected angular speed of the rear wheel without consideration of the detected tire internal pressure of the rear wheel when the detected tire internal pressure of the rear wheel satisfies the pressure condition for the rear wheel.

4. A braking force distribution apparatus for a four-wheeled vehicle, comprising:
   front-wheel braking force application means for applying to left and right front wheels of the vehicle a braking force corresponding to a braking operation;
   rear-wheel braking force application means for applying to left and right rear wheels of the vehicle a braking force corresponding to the braking operation and a control signal;
   front-wheel wheel speed obtaining means for obtaining a front-wheel wheel speed substantially representing the wheel speed of the front wheels;
   rear-wheel wheel speed obtaining means for obtaining a rear-wheel wheel speed substantially representing the wheel speed of the rear wheels;
   slip value calculation means, operable when the braking operation is performed, for calculating a slip value on the basis of the obtained front-wheel wheel speed and rear-wheel wheel speed, the slip value corresponding to the degree of slippage of the rear wheels with respect to the front wheels; and
   control signal generation means for generating the control signal in such a manner that the ratio of the braking force applied to the rear wheels to the braking force applied to the front wheels decreases in accordance with the calculated slip value, wherein the front-wheel wheel speed obtaining means includes:

front-wheel angular speed detection means for detecting angular speed of the left front wheel and angular speed of the right front wheel;

front-wheel tire pressure detection means for detecting internal pressure of the tire of the left front wheel and internal pressure of the tire of the right front wheel;

front-wheel tire pressure condition determination means for determining whether each of the detected internal pressure of the tire of the left front wheel and the detected internal pressure of the tire of the right front wheel satisfies a predetermined pressure condition for the front wheels; and front-wheel wheel speed calculation means for calculating the wheel speed of the front wheels on the basis of the angular speeds of the left and right front wheels when both the detected internal pressures of the tires of the left and right front wheels satisfy the pressure condition for the front wheels, and for calculating the wheel speed of the front wheels on the basis of the angular speed of one wheel which satisfies the pressure condition for the front wheels without consideration of the angular speed of the other wheel which fails to satisfy the pressure condition for the front wheels when only one of the detected internal pressures of the tires of the left and right front wheels satisfies the pressure condition for the front wheels, and the rear-wheel wheel speed obtaining means includes:

rear-wheel angular speed detection means for detecting angular speed of the left rear wheel and angular speed of the right rear wheel;

rear-wheel tire pressure detection means for detecting internal pressure of the tire of the left rear wheel and internal pressure of the tire of the right rear wheel;

rear-wheel tire pressure condition determination means for determining whether each of the detected internal pressure of the tire of the left rear wheel and the detected internal pressure of the tire of the right rear wheel satisfies a predetermined pressure condition for the rear wheels; and rear-wheel wheel speed calculation means for calculating the wheel speed of the rear wheels on the basis of the angular speeds of the left and right rear wheels when both the detected internal pressures of the tires of the left and right rear wheels satisfy the pressure condition for the rear wheels, and for calculating the wheel speed of the rear wheels on the basis of the angular speed of one wheel which satisfies the pressure condition for the rear wheels without consideration of the angular speed of the other wheel which fails to satisfy the pressure condition for the rear wheels when only one of the detected internal pressures of the tires of the left and right rear wheels satisfies the pressure condition for the rear wheels.

5. A braking force distribution apparatus for a four-wheeled vehicle, comprising:

front-wheel braking force application means for applying to left and right front wheels of the vehicle a braking force corresponding to a braking operation;

rear-wheel braking force application means for applying to left and right rear wheels of the vehicle a braking force corresponding to the braking operation and a control signal;

front-wheel wheel speed obtaining means for obtaining a front-wheel wheel speed substantially representing the wheel speed of the front wheels;

rear-wheel wheel speed obtaining means for obtaining a rear-wheel wheel speed substantially representing the wheel speed of the rear wheels;

slip value calculation means, operable when the braking operation is performed, for calculating a slip value on the basis of the obtained front-wheel wheel speed and rear-wheel wheel speed, the slip value corresponding to the degree of slippage of the rear wheels with respect to the front wheels; and control signal generation means for generating the control signal in such a manner that the ratio of the braking force applied to the rear wheels to the braking force applied to the front wheels decreases in accordance with the calculated slip value, wherein, the front-wheel wheel speed obtaining means includes:

front-wheel angular speed detection means for detecting angular speed of the left front wheel and angular speed of the right front wheel;

front-wheel tire temperature detection means for detecting internal temperature of the tire of the left front wheel and internal temperature of the tire of the right front wheel;

front-wheel tire temperature condition determination means for determining whether each of the detected internal temperature of the tire of the left front wheel and the detected internal temperature of the tire of the right front wheel satisfies a predetermined temperature condition for the front wheels; and front-wheel wheel speed calculation means for calculating the wheel speed of the front wheels on the basis of the angular speeds of the left and right front wheels when both the detected internal temperatures of the tires of the left and right front wheels satisfy the temperature condition for the front wheels, and for calculating the wheel speed of the front wheels on the basis of the angular speed of one wheel which satisfies the temperature condition for the front wheels without consideration of the angular speed of the other wheel which fails to satisfy the temperature condition for the front wheels when only one of the detected internal temperatures of the tires of the left and right front wheels satisfies the temperature condition for the front wheels, and the rear-wheel wheel speed obtaining means includes:

rear-wheel angular speed detection means for detecting angular speed of the left rear wheel and angular speed of the right rear wheel;

rear-wheel tire temperature detection means for detecting internal temperature of the tire of the left rear wheel and internal temperature of the tire of the right rear wheel;

rear-wheel tire temperature condition determination means for determining whether each of the detected internal temperature of the tire of the left rear wheel and the detected internal temperature of the tire of the right rear wheel satisfies a predetermined temperature condition for the rear wheels; and rear-wheel wheel speed calculation means for calculating the wheel speed of the rear wheels on the basis of the angular speeds of the left and right rear wheels when both the detected internal temperatures of the tires of the left and right rear wheels satisfy the temperature condition for the rear wheels, and for calculating the wheel speed of the rear wheels on the basis of the angular speed of one wheel which satisfies the temperature condition for the rear wheels without consideration of the angular speed of the other wheel which fails to satisfy the temperature condition for the rear wheels when only one of the detected internal temperatures of the tires of the left and right rear wheels satisfies the temperature condition for the rear wheels.

6. A braking force distribution method for a vehicle, comprising:

detecting angular speed of a front wheel of the vehicle;
  detecting internal pressure of the tire of the front wheel;
  calculating a wheel speed of the front wheel on the basis of the detected angular speed of the front wheel and the detected internal pressure of the tire of the front wheel;
  detecting angular speed of a rear wheel of the vehicle;
  detecting internal pressure of the tire of the rear wheel;
  calculating a wheel speed of the rear wheel on the basis of the detected angular speed of the rear wheel and the detected internal pressure of the tire of the rear wheel;
  calculating, when a braking operation is performed, a slip value on the basis of the calculated wheel speed of the front wheel and wheel speed of the rear wheel, the slip value corresponding to the degree of slippage of the rear wheel with respect to the front wheel;
  generating a control signal in such a manner that the ratio of the braking force applied to the rear wheel to the braking force applied to the front wheel decreases in accordance with the calculated slip value; and
  applying to the front wheel of the vehicle a braking force corresponding to the braking operation, and applying to the rear wheel of the vehicle a braking force corresponding to the braking operation and the generated control signal.

7. A braking force distribution method according to claim 6, further comprising:

setting, in response to an external operation signal, values corresponding to the tire internal pressure of the front wheel and the tire internal pressure of the rear wheel, respectively, as a reference tire pressure of the front wheel and a reference tire pressure of the rear wheel;
  calculating a value indicative of a change in dynamic load radius of the tire of the front wheel on the basis of a deviation of the detected tire internal pressure of the front wheel from the reference tire pressure of the front wheel, and calculating the wheel speed of the front wheel on the basis of the detected angular speed of the front wheel and the calculated value indicative of the change in dynamic load radius of the tire of the front wheel;
  calculating a value indicative of a change in dynamic load radius of the tire of the rear wheel on the basis of a deviation of the detected tire internal pressure of the rear wheel from the reference tire pressure of the rear wheel, and calculating the wheel speed of the rear wheel on the basis of the detected angular speed of the rear wheel and the calculated value indicative of the change in dynamic load radius of the tire of the rear wheel; and
  calculating the slip value on the basis of the calculated wheel speed of the front wheel and the calculated speed of the rear wheel.

* * * * *